(12) United States Patent
Sen et al.

(10) Patent No.: US 8,301,589 B2
(45) Date of Patent: Oct. 30, 2012

(54) SYSTEM AND METHOD FOR ASSIGNMENT OF UNIQUE IDENTIFIERS IN A DISTRIBUTED ENVIRONMENT

(75) Inventors: Raj Kumar Sen, Assam (IN); Gangavara Prasad Varakur, Livermore, CA (US)

(73) Assignee: Sybase, Inc., Dublin, CA (US)

( * ) Notice: Subject to any disclaimer, the term of this patent is extended or adjusted under 35 U.S.C. 154(b) by 1515 days.

(21) Appl. No.: 11/691,386

(22) Filed: Mar. 26, 2007

(65) Prior Publication Data
US 2007/0276833 A1    Nov. 29, 2007

Related U.S. Application Data

(60) Provisional application No. 60/767,522, filed on May 10, 2006.

(51) Int. Cl.
*G06F 17/30* (2006.01)
(52) U.S. Cl. ........ 707/610; 707/620; 707/633; 707/635; 707/626; 707/623; 707/636
(58) Field of Classification Search .................. 709/248; 707/8, 103, 102, 610, 631, 635, 638, 633, 707/636
See application file for complete search history.

(56) References Cited

U.S. PATENT DOCUMENTS

| | | | |
|---|---|---|---|
| 4,851,988 A | | 7/1989 | Trottier et al. |
| 5,884,322 A | * | 3/1999 | Sidhu et al. ............. 707/200 |
| 5,933,824 A | * | 8/1999 | DeKoning et al. ............. 707/8 |
| 6,105,030 A | * | 8/2000 | Syed et al. ............. 707/10 |
| 6,324,571 B1 | | 11/2001 | Hacherl |
| 6,438,559 B1 | * | 8/2002 | White et al. ............. 707/103 R |
| 6,449,640 B1 | | 9/2002 | Haverstock et al. |
| 6,457,053 B1 | * | 9/2002 | Satagopan et al. ............. 709/226 |
| 6,687,707 B1 | * | 2/2004 | Shorter ............. 707/103 R |
| 6,973,473 B1 | | 12/2005 | Novaes et al. |
| 2003/0088574 A1 | * | 5/2003 | White et al. ............. 707/102 |
| 2004/0098425 A1 | * | 5/2004 | Wiss et al. ............. 707/204 |
| 2005/0086384 A1 | * | 4/2005 | Ernst ............. 709/248 |
| 2007/0011116 A1 | * | 1/2007 | Vauclair ............. 706/16 |
| 2007/0101074 A1 | * | 5/2007 | Patterson ............. 711/156 |

OTHER PUBLICATIONS

Adaptive Server Enterprise 15.0 Configuration Guide [Windows], Sybase, Inc. (Doc ID: DC38421-01-1500-02), Jun. 2006.
Adaptive Server Enterprise 15.0 Insallation Guide [Windows], Sybase, Inc. (Doc ID: DC35888-01-1500-02), May 2006.
Adaptive Server Enterprise 15.0 Reference Manual: Building Blocks, Sybase, Inc. (Doc ID: DC36271-01-1500-02), Oct. 2005.
An Introduction to Database Systems (Ch 1-4), 7th Ed., Addison Wesley, 2000.
Information Technology—Database languages—SQL, American National Standard ANSI/ISO/IEC 9075: 1992.

\* cited by examiner

*Primary Examiner* — Sherief Badawi
(74) *Attorney, Agent, or Firm* — Sterne, Kessler, Goldstein and Fox P.L.L.C.

(57) ABSTRACT

System and method for assignment of unique identifiers in a distributed environment. In a distributed system having a plurality of nodes, a method for allocating identifiers comprises steps of: allocating a pool of identifiers for use; maintaining lists of free identifiers in the pool at participating nodes; obtaining at a first node permission to update the lists of free identifiers; upon receiving permission to update the lists, allocating for the first node a set of identifiers from the lists; updating the lists of free identifiers to reflect allocation of the set of identifiers for the first node; sending the updated lists from the first node to other participating nodes; upon receiving the updated lists of free identifiers at each other participating node, updating each other participating node's respective copy of the lists of free identifiers; and relinquishing the first node's permission to update the lists of free identifiers.

49 Claims, 10 Drawing Sheets

SYSTEM AND METHOD FOR ASSIGNMENT OF UNIQUE IDENTIFIERS IN A DISTRIBUTED ENVIRONMENT

CROSS REFERENCE TO RELATED APPLICATIONS

The present application is related to and claims the benefit of priority of the following commonly-owned, presently-pending provisional application(s): application Ser. No. 60/767,522, filed May 10, 2006, entitled "System and Method for Assignment of Unique Identifiers in a Distributed Environment", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix Under Sec. 1.52(e):
This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.
Object Description: SourceCode.txt, size: 34994 Bytes, created: Mar. 19, 2007 10:05:16 AM; Object ID: File No. 1; Object Contents: Source code.

BACKGROUND OF INVENTION

1. Field of the Invention

The present invention relates generally to data processing environments and, more particularly, to allocation and management of unique identifiers, especially in distributed database environments.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

In any networked system, whether database or otherwise, unique identifiers are needed for various purposes. In modern computing systems, for instance, unique identifiers are often associated with system generated objects to clearly identify an object to the system and distinguish any one object from others in the system. Examples include users, groups of users, files, and hardware components (e.g., printers), all of which have a unique identifier assigned. The generation and maintenance of unique identifiers therefore serves a critical role in data processing environments.

In database systems, unique identifiers are needed when new objects are created. For instance, one typical use is for assigning unique identifiers for rows in a table, that is "row IDs" (popularly known as ROWIDs or RIDs) to uniquely identify a particular row. Particularly challenging is the allocation and management of unique identifiers for use in distributed systems. In a distributed system, all the computers in the network need unique identifiers for doing their computation; objects processed by those computers may themselves need to be uniquely identified across the multiple computers that comprise the distributed system. Thus, there is a need for allocating and managing identifiers that are unique across the entire distributed system.

One approach to the problem is described in U.S. Pat. No. 6,457,053. The approach is based on a master-slave relationship as follows. A system for multi-master unique identifier allocation includes a server for allocating pools of identifiers to requesting servers and at least one server for requesting pools of identifiers and allocating individual identifiers as necessary. A single master server allocates "pools" of unique identifiers to network servers upon request. The network servers, in turn, allocate unique identifiers from their pool as necessary when the network server generates new system objects. When a network server's pool of unique identifiers is nearly depleted, the network server requests an additional pool of identifiers from the master server.

However, as the approach is based on a master-slave relationship, it is not fully distributed (i.e., it requires centralized management). This may lead to problems and limitations, including inefficient messaging and inferior scalability. As one example, the reliance on centralized management has limitations and inefficiencies in handling the addition and deletion of server nodes of the distributed system during ongoing operations, particularly in the case of failure (e.g., crash) of one or more of the server nodes. For instance, if the master server fails or is shut down, another server must take over the role of master, including obtaining the information necessary to serve in the master role. Also, in the event that one of the "slave" nodes (i.e., a network server other than the master) fails or is shut down, unique identifiers assigned to such node may be lost (i.e., no longer available) for use by the other servers. In view of limitations and inefficiencies such as these, a better solution is sought. In particular, what is needed is a system incorporating a methodology of assigning these unique identifiers in a manner which is not centralized and may therefore fully participate in all of the features and benefits of distributed environments, including improved scalability. Ideally, the solution should gracefully and efficiently handle the addition and removal of networked server nodes from the cluster, including those resulting from failure of one or more of the nodes. The present invention fulfills this and other needs.

SUMMARY OF INVENTION

System and method for assignment of unique identifiers in a distributed environment is described. In one embodiment, for example, in a distributed system having a plurality of nodes, a method of the present invention is described for allocating identifiers for use at nodes of the distributed system, the method comprises steps of: allocating a pool of identifiers for use in the system; maintaining lists of free identifiers in the pool at participating nodes in the system; obtaining at a first node permission to update the lists of free identifiers; upon receiving permission to update the lists, allocating for the first node a set of identifiers from the lists of free identifiers; updating the lists of free identifiers to reflect allocation of the set of identifiers for the first node; sending the updated lists of free identifiers from the first node to other participating nodes; upon receiving the updated lists of free identifiers at each other participating node, updating each other participating node's respective copy of the lists of free identifiers; and relinquishing the first node's permission to update the lists of free identifiers.

In another embodiment, for example, a system of the present invention for allocating identifiers for use at a plurality of database server nodes sharing access to a database is described that comprises: a database; a plurality of database server nodes connected to each other via a network and sharing access to the database; an identity data structure at each database server node for maintaining information about identifiers allocated for use among the plurality of database server nodes; a distributed lock for regulating access to the identity data structure at the plurality of server nodes; and an identity manager, responsive to a request for identifiers at a given node, for acquiring the distributed lock on the identity data structure, allocating a set of identifiers to the given node upon acquiring the distributed lock, updating the identity data structure at the plurality of database server nodes to reflect allocation of the set of identifiers for the given node, and relinquishing the distributed lock after completion of updates to the identity data structure at all database server nodes.

In yet another embodiment, for example, in a distributed database system having a plurality of nodes sharing access to a database, a method of the present invention is described for allocating identifiers for use at nodes of the distributed system, the method comprises steps of: allocating a pool of identifiers from the database for use among the plurality of nodes of the distributed database system; maintaining information about the pool of identifiers at each of the nodes in an identity data structure; in response to a request for identifiers at a given node, providing identifiers from a set of identifiers previously allocated for use at the given node while identifiers remain in the set allocated for the given node; when no identifiers remain in the set, obtaining additional identifiers for use at the given node by performing substeps of: acquiring a lock on the identity data structure at each of the nodes; allocating identifiers available in the pool for use at the given node; updating the identity data structure to reflect allocation of the identifiers for the given node; and upon updating the identity data structure at all nodes, relinquishing the lock.

DETAILED DESCRIPTION

Glossary

Figure 1:
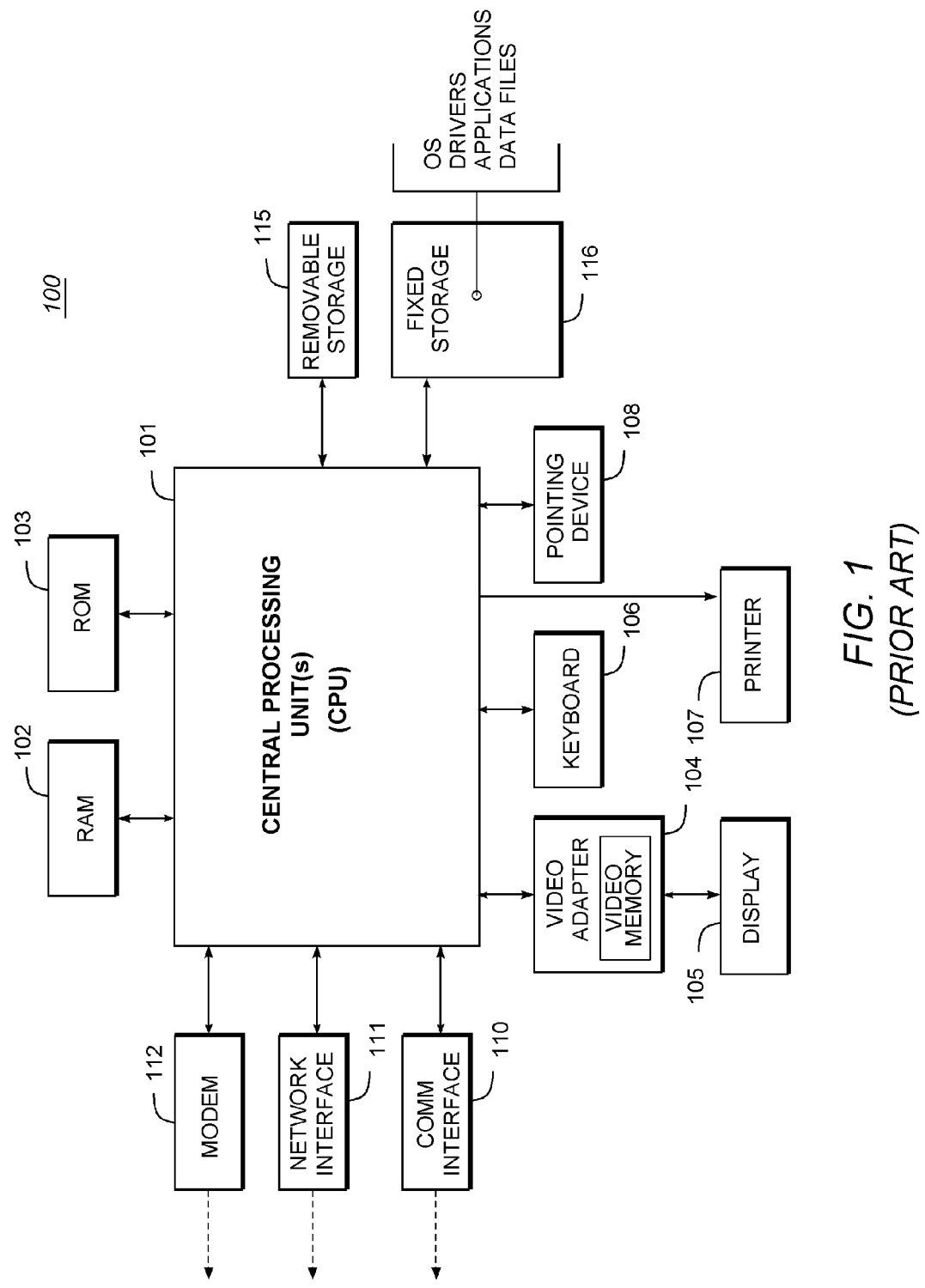
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Cluster: A collection of more than one networked and usually homogeneous systems, which function as a single system. All the instances in the cluster communicate with each other typically through private interconnects.

Clustered Server: A clustered server refers to a database server instance which runs on a Shared Disk Cluster and jointly manages a single installation of the database on the shared disks.

DES: DES refers to table descriptor, which in the currently preferred embodiment of the present invention is stored on all instances in the cluster.

DES Scavenge: Refers to the operation of scavenging an object descriptor, where the in-memory object descriptor needs to be released and the memory reused for some other purpose.

Failover Handling: The recovery of a node which failed in the cluster, by another node in the cluster.

Identity Column: A column of a table which has the property "IDENTITY" and which is populated automatically with a new value every time a row is inserted into the table. This new identity value is internally generated and is guaranteed to be different from all the previously generated identity values for that table.

Identity value or identifier: a value used to populate the identity column of a table. In the currently preferred embodiment of the present invention, identity values are unique, but are not required to be monotonically increasing.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Node or Server Instance: A clustered server in a Shared Disk Cluster.

Node (Instance) Failover: refers to the possibility of an instance in the cluster going down due to software or hardware failure, resulting in a surviving coordinator instance taking action to recover the instance.

OCM lock: A distributed lock which serves as the exclusive right to update a data value in a distributed networked system.

PSS: PSS refers to a task descriptor.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

Shared Disk Cluster: Refers to a cluster system where multiple database server instances on two or more machines manage the same disk image of the database, by having shared access to disk storage.

Symmetric Multiprocessing: Symmetric Multiprocessing (SMP) is a computer architecture that provides fast performance by making multiple CPUs available to complete individual processes simultaneously (multiprocessing). Unlike asymmetrical processing, any idle processor can be assigned any task, and additional CPUs can be added to improve performance and handle increased loads. SMP is used herein as shorthand for a single instance of a server running on a multi-CPU machine.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, a HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Client-Server Database Management System

Figure 2:
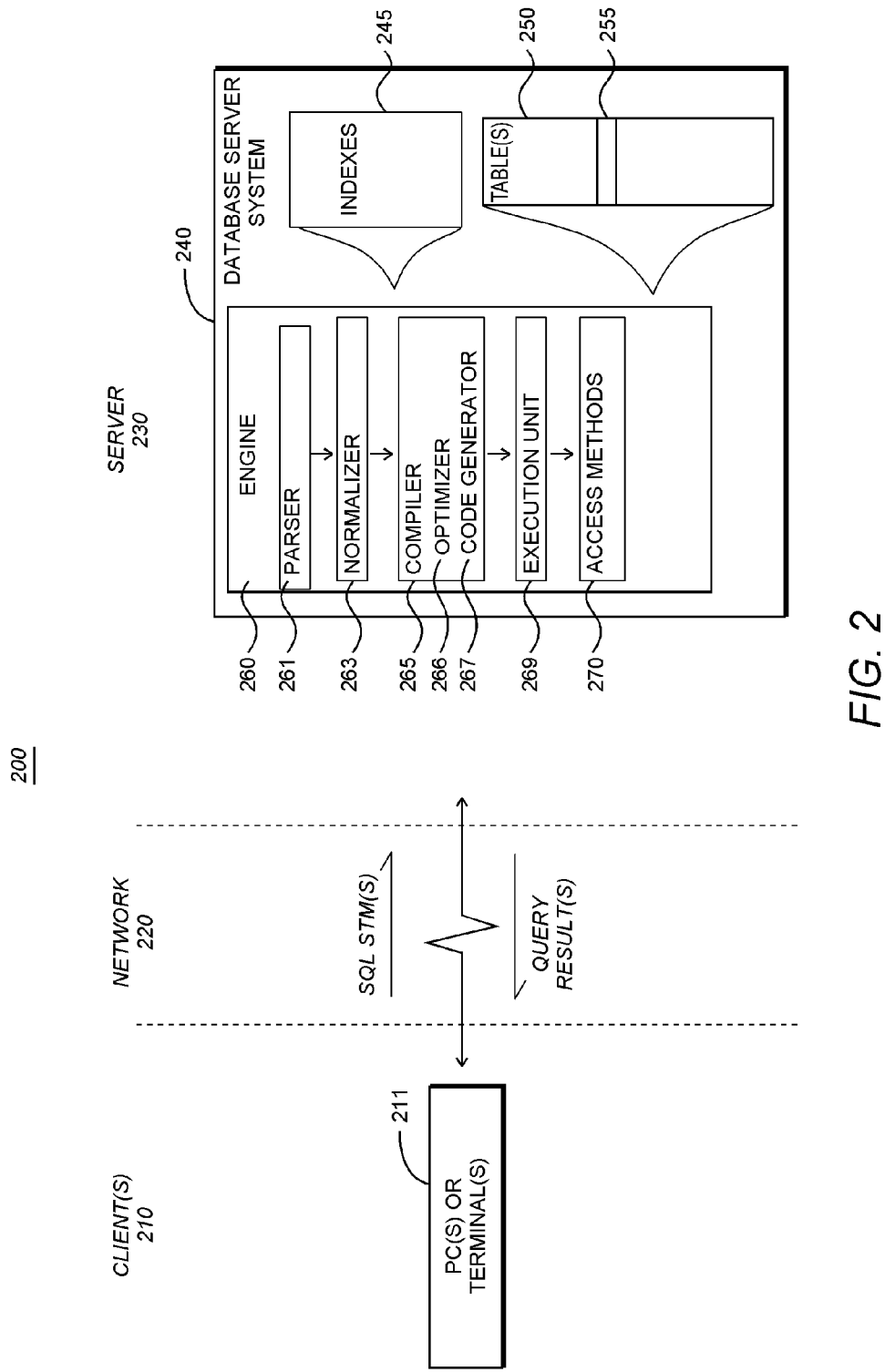
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. (Specific modifications to the system 200 for implementing methodologies of the present invention are described in subsequent sections below.) As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 15.0 Collection: (1) Core Documentation Set and (2) Installation and Configuration," available from Sybase, Inc. of Dublin, Calif. This product documentation is available via the Internet (e.g., currently at sybooks.sybase.com). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter "A".

Although client/server database systems remain in wide use, the present invention, in its currently preferred embodiment, is implemented in a Shared Disk Cluster database system environment, which provides several advantages compared to prior art client/server database systems. Among these advantages are that a Shared Disk Cluster system can be more easily expanded. Users may easily add additional servers (nodes) in order to increase system capacity and provide improved performance without major data restructuring and the associated system downtime. This also enables users to purchase hardware in smaller increments as needed to keep up with growth. Other advantages of a Shared Disk Cluster architecture include lower total cost of ownership (TCO), continuous availability, high performance, and single system presentation.

Figure 3:
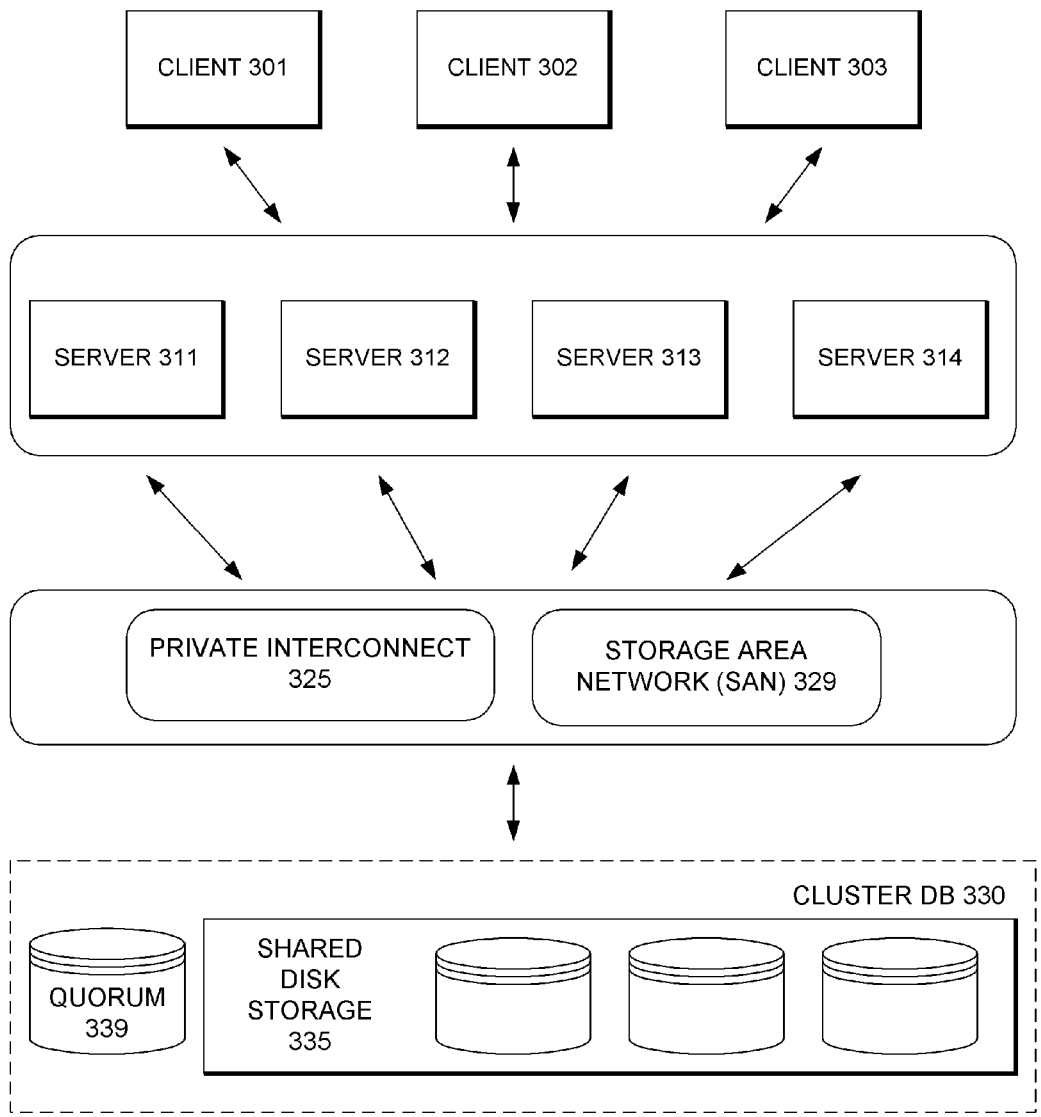
FIG. 3 is a high-level block diagram of a Shared Disk Cluster database system environment illustrating an example of a four node Shared Disk Cluster accessed by a plurality of clients.

FIG. 3 is a high-level block diagram of a Shared Disk Cluster database system environment 300 illustrating an example of a four node (servers 311, 312, 313, 314) cluster accessed by a plurality of clients (clients 301, 302, 303). The term "cluster" refers to a collection of more than one networked (and usually homogeneous) nodes, which function as a single system. Each node generally contains its own CPU and memory resources. The term "clustered server" refers to a database server (currently implemented using Sybase® Adaptive Server® Enterprise ("ASE") available from assignee Sybase of Dublin, Calif.) which runs on a cluster (cluster DB 330) and jointly manages a single installation of the databases on the shared disk storage 335. As shown, the environment 300 also includes a quorum disk 339. The quorum disk 339 is a shared disk device used for cluster membership arbitration. The quorum disk also maintains a history of runtime cluster view changes.

A Shared Disk Cluster database system can be implemented using low cost "blade servers" such as Intel/Linux machines. In the presently preferred embodiment, nodes in the cluster communicate with each other through private interconnects (e.g., private interconnect 325). As shown at FIG. 3, the nodes are interconnected via redundant high-speed interconnects with each node also having a direct connection to all databases on a disk subsystem. Gigabit Ethernet and Infiniband may be used to provide these high-speed interconnects. The storage subsystem may be implemented using raw device support with a storage area network (SAN 329) or with file system support (e.g., through use of a clustered file system such as those from Veritas or Polyserv).

The above-described computer hardware and software are presented for purposes of illustrating the basic underlying desktop and server computer components that may be employed for implementing the present invention. For purposes of discussion, the following description will present examples in which it will be assumed that there exist multiple server instances (e.g., database server nodes) in a cluster that communicate with one or more "clients" (e.g., personal computers or mobile devices). The present invention, however, is not limited to any particular environment or device configuration. Instead, the present invention may be implemented in any type of system architecture or processing environment capable of supporting the methodologies of the present invention presented in detail below.

Overview of Assignment of Unique Identifiers in Distributed Environment

An efficient system for assigning unique identifiers in a distributed system environment is described. The system and methodology of the present invention provides for distributing unique identifiers among nodes of the distributed system in a manner which ensures that there is reduced messaging among the nodes in the network when identifier allocation is in progress. Also, the approach provides the option for reuse of values for node(s) leaving the network, and for redistribution of identifiers when there are no free lists available.

In a system constructed in accordance with the present invention, information about the free lists of unique identifiers is available at all the nodes. Copies of the same free list are effectively stored in all the nodes. Any node which wants to grab some identifiers will not need to ask any other node for these identifiers since each node has its own copy of the free list of identifiers stored locally and can allocate from that copy. Once a node allocates some identifiers for itself, it will update other nodes about the allocation.

At a high level, the system and methodology for allocation of unique identifiers proceeds as follows. First, the allocating node obtains the right to update the identifier lists through a distributed locking mechanism. Second, having received the right to update the identifier lists, the allocating node allocates for itself a set of identifiers from a free list of identifiers and updates the free list of identifiers to reflect the new allocation. Having allocated for itself a new set of identifiers and updated the free list of identifiers, the allocating node sends the updated free list of identifiers to all the other nodes. Upon receiving the updated free list of identifiers, each of the other nodes updates its own respective copy of the free list of identifiers. Finally, the allocating node relinquishes the right to update (which was received in the initial step).

If a node leaves the system, a mechanism is employed to use the values left unused by the leaving node. This leads to the feature that even if all the nodes leave the system, the system ensures that the unused identifiers are not lost and will be reused. The identifiers may be (optionally) redistributed among the nodes when the free list of identifiers gets exhausted and no free identifiers remain. All told, the approach provides new methods for efficiently distributing the identifiers among the nodes, which improves scalability and reduces messaging between nodes. Before describing the operations of the present invention in more detail, some terms and concepts that are used in the following discussion will be explained.

Introduction to Unique Identifiers

Use of Unique Identifiers: Identity Column

Identity values in an identify column of a table need to be unique for every row in the table, so as to uniquely identify a particular row within a given table. A table descriptor (i.e., DES) maintains the last identity value assigned. This value is incremented whenever a row is added, thus maintaining the uniqueness property. (In a SMP server environment, there is only one copy of the DES and hence synchronization at the DES level suffices.)

In a distributed environment, such as a Shared Disk Cluster environment as illustrated at FIG. 3, DES is instantiated at multiple cluster nodes which will be inserting rows in a table. In a cluster environment, the uniqueness of the identity value in an identity column needs to be maintained amongst nodes the cluster that are sharing access to data maintained by the database. Therefore, synchronization has to be performed at the cluster level across the various instantiations of the DES to ensure the property of uniqueness. A naive approach to ensure uniqueness is to define an "OCM lock" for the last identity value. Whenever a node wants to insert a row it grabs the lock in exclusive mode. However, it is very inefficient to grab a lock for every insert to a table.

The present invention addresses the fundamental problem of how a clustered server node can obtain an identity value which is unique across the distributed environment. The present invention provides a solution which has minimal performance overhead and at the same time is simple to implement. The solution also efficiently handles nodes leaving the cluster, nodes joining the cluster, failure situations and the like.

Identity Gaps

By default, the database system in which the present invention is currently implemented (Sybase® Adaptive Server® Enterprise, available from Sybase, Inc. of Dublin, Calif.) allocates a block of identity values (unique identifiers) in memory instead of writing each identifier (identity value) to disk as it is needed (which would require more processing time). In doing so, the system writes the highest number of each block to the table's "sysobjects" (system objects) row. This number is used as the starting point for the next block after the currently allocated block of numbers is used or "burned". The other numbers of the block are held in memory, but are not saved to disk. Numbers are considered burned when they are allocated to memory, then deleted from memory either because they were assigned to a row, or because they were erased from memory due to some abnormal occurrence such as a system failure. Examples of such system failure are "shutdown with nowait" and the like.

Allocating a block of unique identifiers (identity values) improves performance by reducing contention for the sysobjects row of the table. However, some problems remain. For example, if the system fails or is shut down with no wait before all the identifiers are assigned, the unused identifiers are burned (i.e., lost). For example, assume that a block of 1000 unique identifiers is obtained. When the system is running again, it starts numbering with the next block of numbers based on the highest number of the previous block that was written to disk. For example, if the first 1000 unique identifiers has been burned, another block (e.g., 1001 to 2000) will be obtained from the disk and brought into memory and so on and so forth. Depending on how many allocated numbers were assigned to rows before the failure, one may have a large gap in the identity values.

In the presently preferred embodiment, several parameters are provided to control these identity block sizes:

1. Identity burning set factor: This is a server-wide setting and essentially represents a default identity gap setting if the identity gap for a particular table is not specified. The burning set factor indicates a percentage of the total available identifiers (identity values) one wants to have allocated for each block. This setting is the same for all tables.

2. identity_gap: This is a table-specific setting. This setting overrides the burning set factor for a specific table so as to create identifier (identity value) blocks of a specific size for the table. The identity_gap setting overrides the identity burning set factor for the table.

3. identity grab size: Also a server-side setting which reserves a block of contiguous identifier numbers for each process/task. For every object a process/task will acquire blocks of size="identity grab size". This setting works with the identity_gap and identity burning set settings. In operation, an identity burning set (or identity_gap) number of identity values (IDs) are allocated to the server and information about this allocation is kept in DES. When a given process/task requires identity values, an "identity grab size" number of the allocated IDs (identity values) is assigned to the process/task as described below in more detail. For example, a block of 20 identifiers may be assigned to a task requesting identity values if the identity grab size is set to 20. Assigning these values in blocks (rather than one by one) reduces contention amongst tasks at a given node.

As described above, the parameter identity_grab_size is associated with a given task/process which can reside on any node of the cluster. The identity gap and identity burning set parameters have the same characteristics except that one is a server-wide setting and the other is table-specific setting. In the discussions that follow, references to identity gaps may refer to either the identity_gap setting or the identity burning set factor (unless otherwise indicated by the context). It should also be noted that the identity_gap setting has an impact on the number of identity values that may be lost in the event of a cluster or node crash. Generally, in the case of cluster/node crash, one may lose a maximum of the identity_gap number of identity values. The identity gap also has performance implications. If the identifiers are taken from disk in smaller blocks, one may have to access the disk more frequently to obtain needed identity values.

It should be observed that because of caching of identity values and the identity grab size parameter, identity columns in a table need not be monotonically increasing. In the currently preferred embodiment, they are monotonically increasing for a particular process, such as, for example, isql (interactive SQL) session. However, multiple processes can insert rows in any order as only uniqueness for the identity columns is needed.

Distributed System Environment

Figure 4:
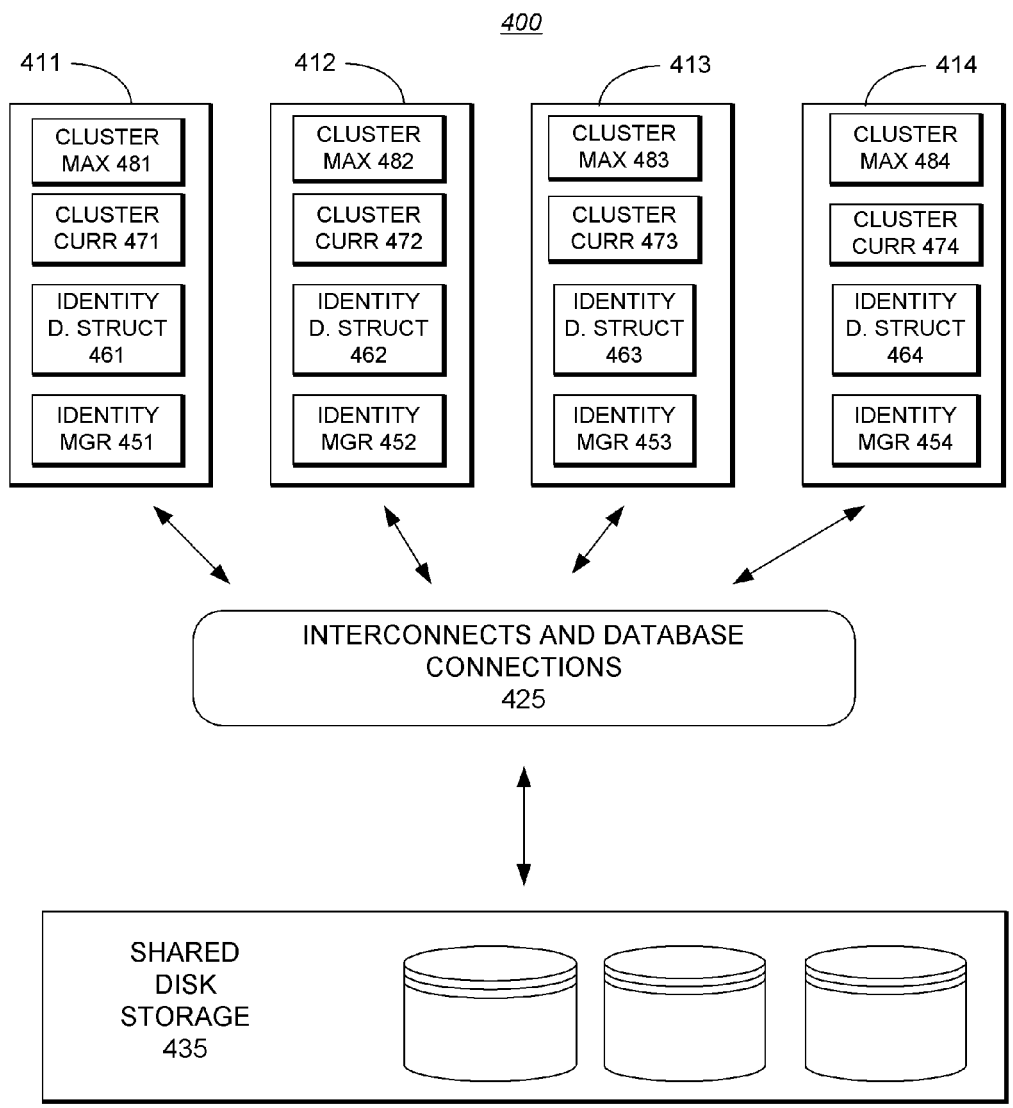
FIG. 4 is a high level block diagram illustrating a distributed system environment in which the system and methodology of the present invention may be implemented.

FIG. 4 is a high level block diagram illustrating a distributed system environment 400 in which the system and methodology of the present invention may be implemented. As shown, a cluster of four networked server nodes (411, 412, 413, 414) share access to data on shared disk storage 435. As also shown at 425, the nodes are interconnected and each node has a direct connection to all databases on the shared disk storage 435. An identity manager (identity mgr) module at each node of the cluster as shown at 451, 452, 453, 454 at FIG. 4 implements methodology of the present invention. The identity manager manages and maintains information about identifiers allocated at each node of the cluster as hereinafter described in detail. The identity manager module at a given server node interacts with its counterparts at other nodes and writes information to, and retrieves information from the shared disk storage 435 and identity data structures at each of the nodes as shown at 461, 462, 463, 464. As shown at FIG. 4, the information maintained at each node includes an identity data structure 461, 462, 463, 464, a cluster current value as shown at 471, 472, 473, 474, and a cluster maximum value as shown at 481, 482, 483, 484. This information is protected by a distributed locking mechanism (OCM lock), which is not separately shown at FIG. 4

In operation, when identifiers (identity values) are needed at nodes of the cluster, one of the identity managers (e.g., identity manager 451 at node 411) would obtain block of identifiers from the sysobjects row of a database table stored on shared disk storage 435. This block could be obtained on initial start-up of the system, but a more typical case in which identifiers would be requested is when a prior block of identifiers has been used or "burned". Assume for example, a block of 1000 identifiers is obtained from sysobjects row by the identity manager 451. As part of this operation, identity manager 451 informs the other identity manager modules (e.g., 452, 453, 454) and the allocation of this block of identifiers is recorded at all of the nodes.

The identity manager then divides up the block of identifiers so that identifiers could be provided for use at a given node in response to demand. In the presently preferred embodiment, an "equal sharing cluster approach" method is utilized, as described in more detail below. For instance, using this same example of a block of 1000 identifiers and a four node cluster, the block of 1000 identifiers is divided into four blocks of 250 each. Although an equal sharing approach is utilized in the currently preferred embodiment, those skilled in the art will appreciate that various other methods may be used to allocate the blocks of identifiers amongst nodes of the cluster. Although the identifiers are divided into four blocks of 250, the approach utilized in the currently preferred embodiment is to provide these blocks to a given node on demand. In other words, identity values are assigned to a given node, as needed and are not pre-allocated to each of the nodes in equal quantities. This allows for the possibility that some of the nodes will likely use more (or less) blocks than others (e.g., one node could, for example, use the entire block of 1000 identifiers if it was the most active).

Identifiers allocated for use at a given node are then made available to tasks at the node needing them for performing operations. This may be illustrated by example. Assume, for instance, that a given task (not separately shown at FIG. 4) at node 411 requires identity values in order to perform operations. The task would interact with the identity manager module 451 at node 411 in order to obtain the needed identifiers (identity values). If necessary (i.e., if there were not sufficient identifiers already allocated for use at that particular node), identity manager 451 would allocate a block of identifiers (e.g., 250 identifiers) for use at node 411 and would update the identity managers at the other nodes (i.e., identity managers 452, 453, 454) as to this allocation. Information about the allocation is also stored at each of the nodes (e.g., by updating the identity data structure 461 and cluster current 471 at node 411 and in corresponding structures at other nodes). If identifiers are available at the node and if the above-described identity_grab_size parameter is set, the task will receive the identity_grab_size number of identifiers. For example, if the identity_grab_size parameter is set to 20, the task would receive a block of 20 identifiers from the identity manager 451. This allocation would be tracked locally by the identity manager 451 at node 411; however it would not be communicated to the other nodes (e.g., nodes 412, 413, 414 in this example). Before describing these operations of the present invention in allocating unique identifiers in greater detail, some design considerations and approaches will be described.

Design Considerations

There are various considerations that were observed in designing an approach to for assigning unique identifiers in a Shared Disk Cluster distributed system environment. These considerations include the following:

1. There should not be too much contention amongst nodes of the cluster to obtain identity values.
2. There should not be too much contention at a clustered server node to obtain identity values.
3. In case of DES getting scavenged in a cluster node, the situation should be handled gracefully. Care should be taken to not lose identity values allocated to the node. (Similar situation when a cluster node is shutdown.)
4. A new node joining or leaving the cluster should be impacted minimally.
5. In case of cluster shutdown (or all nodes in a cluster failing), the number of identity values lost should be as few as possible.
6. Failover handling should be addressed.
7. When a given node needs identity values and all identity values have been allocated previously in the cluster, then the node needs to grab unused identity values from other nodes. The period in which the node grabs nodes from other nodes is known as "grabbing period" and if a node joins/leaves the cluster during this period or there is a DES scavenge, the solution should be able to handle it.
8. Cluster crash recovery should be possible.

Design Strategy

Two alternative approaches or strategies are available to assign unique identity values in a distributed cluster system environment which are referred to herein as: a) Cluster caching identity scheme, and b) Non-cluster caching identity scheme. Both strategies are based on the assumption that the identity values need to be unique, but do not necessarily need to be monotonically increasing. The present invention uses the cluster caching identity scheme as it provides several advantages, including that it reduces contention on the sysobjects row of database table(s). In typical operation, the sysobjects row is a hot spot for a table and is frequently accessed for a number of reasons which are unrelated to the identity column. The fact that the cluster caching identity scheme has less sysobjects row contention is a major benefit of the cluster caching scheme.

The performance overhead of can be evaluated on the basis of two parameters:

(1) Number of accesses to sysobjects row When a new set of identity values is needed, a new set is burned (with an update of the entry in sysobjects). The field objidentburnmax in des→dobjectc is protected by a distributed lock (referred to as an OCM lock). Any update to this field includes the following steps: a) Take an exclusive (EX) lock on the OCM lock; b) Push the updated value to all the other nodes; c) Log the update; and d) Release the exclusive (EX) lock.

(2) Number of exclusive (EX) locks needed. Every scheme might need its own set of OCM locks for implementing it; the locking overhead associated with those locks will impact the performance of the system.

The cluster caching identity scheme of the currently preferred embodiment will next be described. It should be noted that in the following discussion, some examples are used in which unique identifiers are issued in monotonically increasing sequences. However, it should be understood that this is not required by the present invention.

In the cluster caching identity scheme, the following high-level approach is adopted: allocate IDs (identity values) from the sysobjects row in blocks (chunks) of the size identity_gap and use them in the cluster until the values are exhausted. The first node doing an insert will obtain an allocation of identity_gap number of identity values (IDs) from the sysobjects row. For example, a block of unique identifiers from 1 to 1000 may be allocated for use in the cluster. This is stored in memory at each of the nodes of the cluster as described below in more detail. These allocated identity values are reserved for use in the cluster, but at this point are not yet assigned to particular node(s) of the cluster.

There are various considerations that one should observe in selecting the identity_gap setting. One consideration is the identity_gap number of unique identifiers which are obtained from the disk and cached in memory affects the maximum number of identifiers that are at risk in the event of a system crash. For example, if the identifiers are obtained from disk in smaller blocks (e.g., 100) only a small number would be burned in the event of a crash rather than the larger number at risk if the identifiers are obtained in larger blocks (e.g., 1000). The identity_gap setting also has performance implications. Suppose, for example, a given task has to allocate 950 identity values. If the identifiers are taken from disk in blocks of 100, the system may have to access the disk ten times in order to obtain the required identity values. However, with a larger identity_gap setting of 1000, the disk need only be accessed once (thereby reducing number of times disk accessed and improving performance).

The identity_gap number of values allocated for use in the cluster are made available for use at particular node(s) in response to demand from such node(s). Those skilled in the art will appreciate that a number of techniques may be utilized for allocating the identity values amongst the nodes. In the presently preferred embodiment, the general approach is to divide the block of values allocated for use in the cluster into smaller blocks or units using a methodology which is referred to as an "equal sharing" approach. However, these smaller blocks are only allocated for use at particular node(s) of the cluster in response to demand from such node(s). When there are no available identity values left in the cluster, another identity_gap number of identifiers is allocated from the sysobjects row and so on. For example, after the first 1000 unique identifiers has been burned, another block (e.g., IDs 1001 to 2000) will be obtained and brought into memory for use in the cluster and so on and so forth. These operations of the present invention are described below in more detail.

Equal-Sharing Cluster Approach

The present invention, in its currently preferred embodiment, includes an "equal sharing" allocation methodology to distribute the identity_gap number of values allocated for use in the cluster. As noted above, the system will grab identity_gap number of values from the sysobjects row on behalf of the cluster. Assume, for example, the system may grab 1000 identity values (i.e., based on the identity gap being set to 1000). A parameter called equal_share_value is defined which is equal to (identity_gap/no._of_nodes). If equal_share_value becomes less than 1, equal_share_value is set to 1. The system essentially divides the identity_gap number of values into smaller blocks of a size of equal_share_value. For example, if the identity gap is set to 1000 and there are four nodes in the cluster, equal_share_value will be 250. Note that these smaller blocks of identifiers are not immediately allocated to the nodes of the cluster. Rather, they are allocated in response to demand from the nodes. In other words, the overall identity_gap number of cached values is divided into chunks of size equal_share_value and allocated to the nodes on a demand basis.

Assume that I is the identity_gap and N is the number of nodes. Then, every node gets (I/N) number of identity values from the cached values available with the cluster when it needs identity values. Using the same example above of an identify gap of 1000 and a four node cluster, each node would obtain 250 identity values when it needed additional identity values.

For implementing the present invention, several parameters are also maintained to track the free identifiers that are available for use in the cluster. For every node in the cluster, a node current value (curr_val) and a node maximum value (node_max) are maintained. In addition, a cluster current value (cluster_current) and a cluster maximum value (cluster_max) are also maintained as cluster-wide values. Cluster_current stores the information about the start of the next chunk (block) that can be allocated to a node and cluster_max stores the maximum identity value assigned to the cluster. Thus, at every point of time (cluster_max−cluster_current) identity values are available in the cluster and not yet allocated to any of the nodes. For example, if cluster_max is 2000 and cluster_current is 1500, that indicates that there are 500 identity values available for use by nodes in the cluster that have not yet been allocated to any node. The node current value (curr_val) and node maximum (node_max) values are maintained and used locally at each node. For example, assume identity values 251 to 500 are assigned (allocated) to a given node. The curr_val (current value) is used to keep track of the identity value which has last been used at the node. For example, if the current value is 400 and the max value is 500, then the node still has 100 identity values available for use (node_max−curr_val). When curr_val is equal to node_max, no more identifiers are available at the node. In such event the node would request an additional block of identifiers as described herein.

The curr_val and node_max value for every node along with cluster_current and cluster_max are part of a common data structure (identity data structure) which is protected by an OCM lock. The OCM lock is a distributed lock that synchronizes access to this data structure. A node updating the data structure will acquire the OCM lock, make its updates to the values (e.g., to obtain additional identity values for use by the updating node), push the updated values to the other nodes of the cluster, and then release the lock. Also, for every node state information is maintained which denotes the state of the values, i.e., whether they are allocated or free. This common structure (described below in more detail) is part of DES and hence it is instantiated on all nodes in the cluster where the DES is instantiated. Curr_val for every node is needed to be a part of this common structure to handle the DES Scavenge issue as explained later. After every update of this data structure, the updated values are pushed by the updater to the other nodes in the cluster.

A node can continue its inserts on the table as long as it has free identity values for itself, i.e., its des→curr_val is less than node_max. It does not need to have any lock on the common identity structure for doing the inserts. This reduces the number exclusive locks needed.

The following pseudocode illustrates the operations of the identity manager at a given node n when it finishes its set of values (i.e., des→curr_val becomes equal to node_max):

```
1: Take an exclusive (EX) lock on the identity structure.
2: If cluster_current < cluster_max, then
3: {
4:    If (cluster_current + equal_share_value) < = cluster_max, then
5:    {
6:       a) node_max (n) = cluster_current + equal_share_value
7:          Node_current(n)=cluster_current;
8:       b) cluster_current + = equal_share_value
9:    }
10:   else
11:   {
12:      a) node_max (n) =cluster_max;
13:         Node_current(n)=cluster_current;
14:      b) cluster_current=cluster_max;
15:   }
16:   else
17:   {
18:      Grab a new set of identity_gap values from the sysobjects row
         and
19:      allocate it for the cluster. Also allocate
equal_share_value values
20:      to node n, and update cluster_current and cluster_max.
21:      Set current_node val state as ALLOCATED.
22:   }
23: }
24: Push the updated values to the other nodes in the cluster using
```

-continued

```
25:     callback mechanism
26: Release the exclusive (EX) lock.
```

If cluster_current is less than cluster_max at line 2 above, then identifiers are available in the cluster and additional values do not need to be obtained from the sysobjects row. Otherwise (i.e., if cluster_current is equal to cluster_max) additional values are needed. In this case, the else condition at line 16 applies and a new set of identifiers is grabbed from the sysobjects row and allocated for use in the cluster. As part of this operation, equal_share_value identifiers are allocated to node n, and cluster_current and cluster_max are updated. When the necessary steps are completed, the updated values are pushed (replicated) to other nodes in the cluster as shown at lines 24-25 and the exclusive lock is released as shown at line 26.

Identity Grab Size

The identity manager at a given node also is responsible for providing identity values allocated at the node to tasks needing them. If the identity_grab_size parameter is set, then for every task needing identifiers the identity manager reserves identity_grab_size number of identifiers (IDs) as illustrated by the following:

```
1: If (node_max – node_curr) >= (grab_size) then
2: {
3:     pss.idtval.start= node_curr;
4:     node_curr + = grab_size;
5: }
6: Else
7: {
8:     Take exclusive (EX) lock
9:     if (cluster_max – cluster_current) >= (grab_size) then
10:    {
11:        pss.idtval.start= cluster_current;
12:        cluster_current + = grab_size;
13:    }
14:    else
15:    {
16:        grab from sysobjects, allocate a new set of values for the cluster
and further allocate grab size number of values for the current task.
17:        [ Amount to grab is (identity_gap) + ((grab_size) –
(cluster_max – cluster_current)) ]
18:        pss.idtval.start= cluster_current;
19:        cluster_current + = grab_size;
20:        (node val state is unchanged)
21:    }
22: }
23: Push the updated values to the other nodes in the cluster
24: Release exclusive (EX) lock
```

As illustrated above at line 1, if the number of identifiers available (node_max–node_curr) is greater than or equal to the grab_size, then sufficient identifiers are available at the node. (Note that node_curr is equivalent to curr_val discussed above.) In this case, grab_size number of identifiers are provided to the task and node_curr is incremented by grab_size to indicate the number of identifiers given to the task for its use. However if there are not a sufficient number of identifiers remaining available locally (i.e., previously allocated for use at that node), then the else condition at line 6 applies and steps are taken to obtain additional identifiers from the cluster level. If cluster_max–cluster_current is greater than or equal to the grab_size as shown at line 9 of the above routine, then values are available at the cluster level and are allocated to the node as provided at lines 11-12. Otherwise, if sufficient values are not available, the else condition at line 14 applies and the additional identifiers are obtained from the sysobjects row as shown above at lines 16-20. These operations are described below in more detail.

Figure 5A:
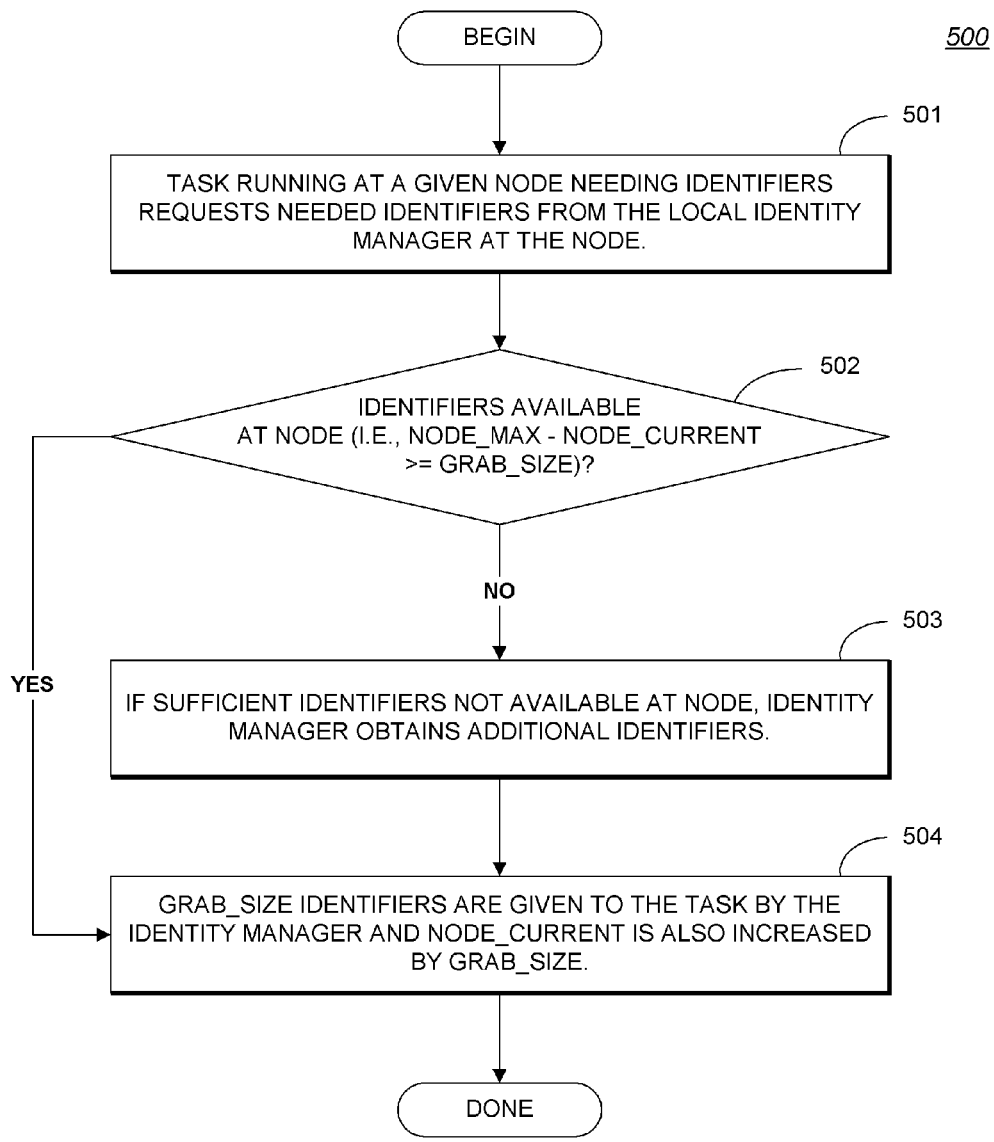
FIG. 5A comprises a flowchart illustrating methodology for allocation of identifiers to tasks at a given node.

FIG. 5A comprises a flowchart illustrating methodology 500 of the present invention for allocation of identifiers to tasks at a given node. When a task needs identifiers for performing operations, the task interacts with the local identity manager at the node to obtain identity values. For example, if a given task T1 requires identifiers, it requests the identifiers from the local identity manager as provided at step 501. In response, the identity manager initially evaluates whether identity values are available locally at decision step 502. If the number of identifiers available (i.e., allocated for use at the node) is greater than or equal to the grab_size, then the method proceeds to step 504; otherwise, it proceeds to step 503. As previously discussed, the number of identifiers available at a given node is equal to the node maximum value minus the node current value (i.e., node_max−node_curr). If, for example, a given task T1 at the node needs 10 values (grab_size=10) and node_max−node_curr is 100, then identifiers are available at the node and the method proceeds to step 504. However, in other instances there may not be sufficient identifiers available locally at the node to satisfy the request. For example, a task T2 running at the same node may need 100 identifiers (i.e., grab_size=100) for performing particular operation(s). Assume, however, there are only 50 identity values available (i.e., node_max−node_curr=50) at the node at the time of the request. In this case the identity manager proceeds to obtain the needed identifiers as shown at step 503. At step 504, grab_size identifiers are given to the task by the identity manager and node_current is also increased by grab_size.

Figure 5B:
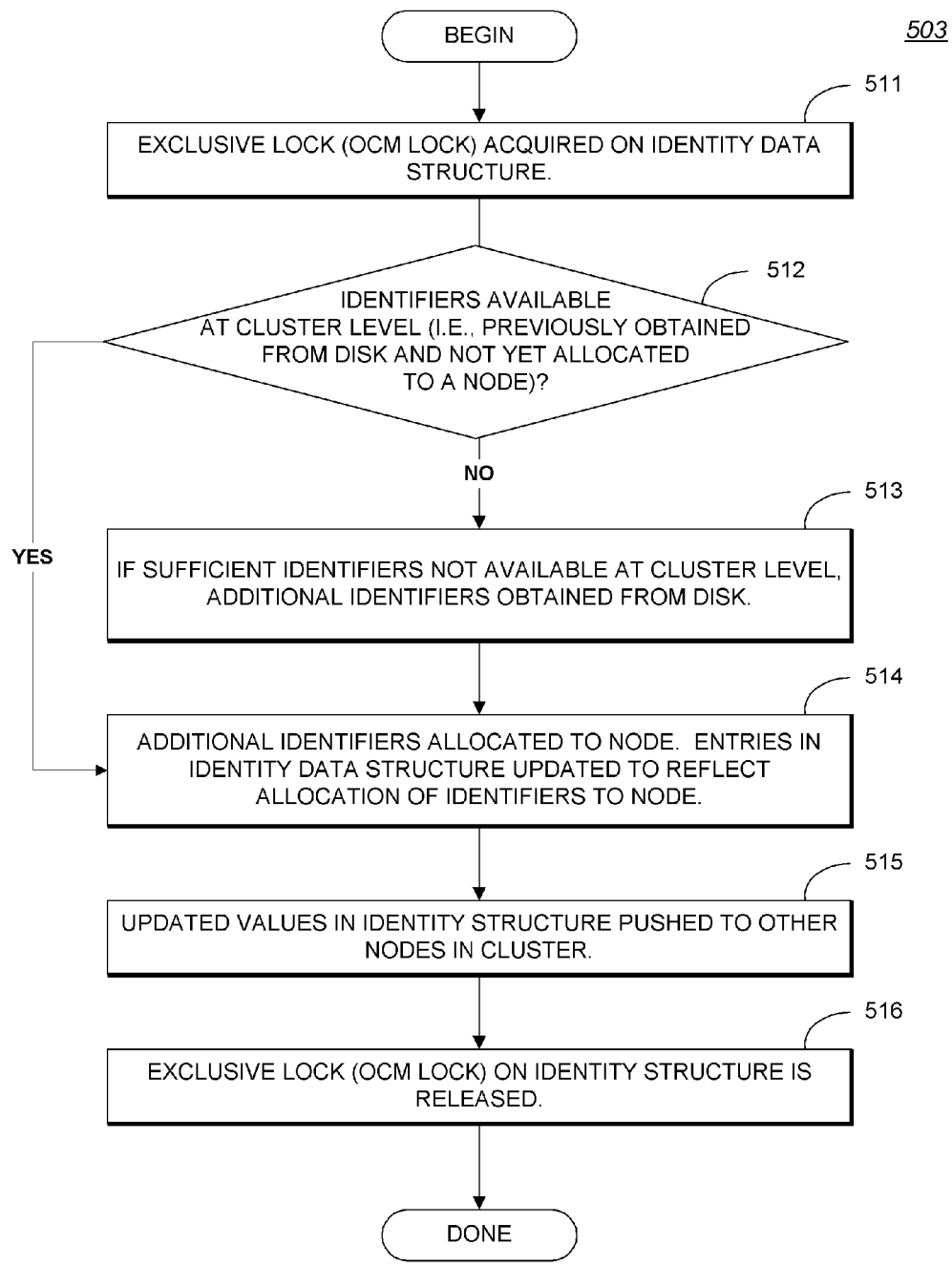
FIG. 5B comprises a flowchart illustrating methodology for allocation of identifiers to a given node in response to demand for identifiers at such node.

FIG. 5B comprises a flowchart 503 (corresponding to step 503 of FIG. 5A) illustrating methodology of the present invention for allocation of identifiers to a given node in response to demand for identifiers at such node. When additional identifiers are needed at a given node, an exclusive lock (OCM lock) is acquired on the identity data structure at step 511. Next, at decision step 512 a check is made to determine if identifiers are available at the cluster level (i.e., have been previously obtained from the sysobjects row and have not yet been allocated to the node(s)). If sufficient identifiers are not available at the cluster level, the method proceeds to step 513 to obtain additional identifiers from disk. Otherwise, if identifiers are available at the cluster level, the method proceeds to step 514 to allocate available identifiers to the node. Entries in the identity data structure are also updated to reflect this allocation of identifiers to the node. After the above steps have been completed, the updated values in the identity structure are pushed to other nodes in the cluster as provided at step 515. At step 516 the OCM lock on the identity structure is released.

Figure 5C:
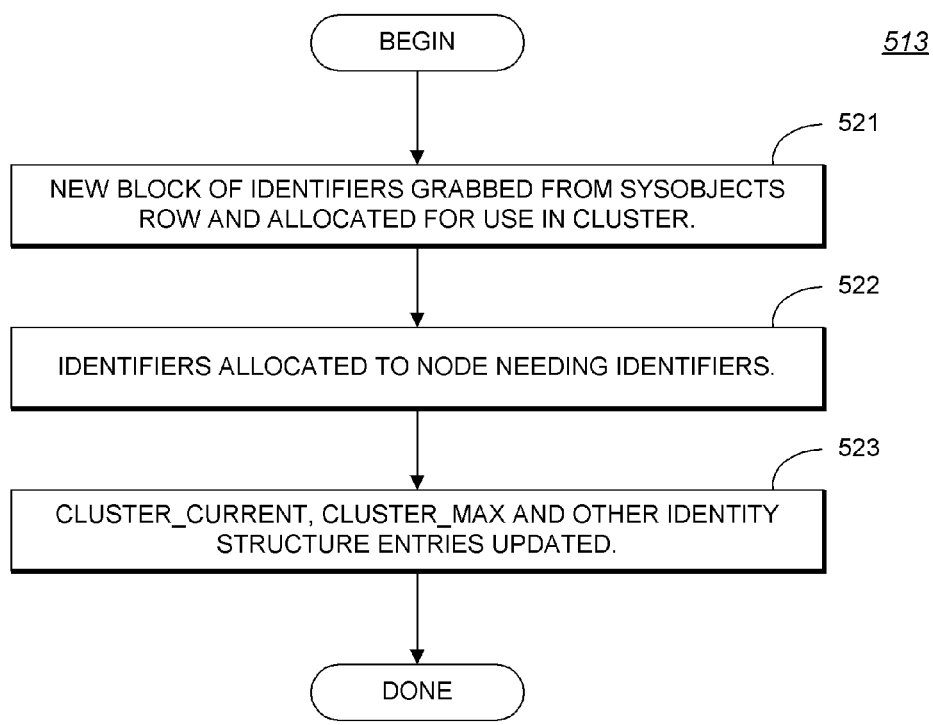
FIG. 5C comprises a flowchart illustrating methodology for an identity manager at a given node to obtain an additional block of identifiers from disk for use in the cluster.

FIG. 5C comprises a flowchart 513 (corresponding to step 513 of FIG. 5B) illustrating methodology of the present invention for an identity manager at a given node to obtain an additional block of identifiers from disk for use in the cluster. When additional values are needed in the cluster, at step 521 a new block of identifiers is grabbed from the sysobjects row and allocated for use in the cluster. At step 522, identifiers are allocated to the node needing them. In the currently preferred embodiment, equal_share_values are generally allocated to the node needing additional identifiers (subject to special handling in some cases as described below). At step 523, cluster_current and cluster_max and other identity data structure entries are updated. After the necessary steps are completed to obtain identifiers for use in the cluster and provide a chunk (block) of identifiers to the requesting node, updated values in the identity structure are pushed (replicated) to other nodes in the cluster and the OCM lock on the identity structure is released as described above and illustrated at steps 514, 515, 516 at FIG. 5B.

Context Migration

From time to time a task running on one node may migrate to another node of the cluster. This may be illustrated by an example referring again to FIG. 4. Assume, for instance, a task T3 (not separately shown at FIG. 4) on node 413 may migrate from node 413 to node 414 of the cluster. Also assume that 20 identity values had previously been allocated to Task T3 (i.e., 20 values cached at the task level) on node 413. The approach of the present invention is to allow the task (e.g., Task T3 in this example) to retain its cached identity values and reuse them in performing operations after the migration to another node in the cluster (e.g., at node 414 in this example). Context migration support is also appropriate as the identifiers grabbed as part of identity_grab_size are task specific and part of PSS. When a task is being migrated to another node, it is also better to try to migrate the unused identity values to the other node so as to avoid gaps. The identity manager provides three functions to support context migration:

a) to check if the task is migratable or not. This returns TRUE always since reusing identity values at other nodes is possible (since already reserved for that task).

b) to package the data on source node. The migration module calls this function on the source node before migration. This function can package all required control info and data, which is delivered to it on the destination node. The range of unused values may be packaged in pss→idtval in this function.

c) to unpackage the data on destination node. After a task is successfully migrated, this function is invoked to unpackage the data received from the source node. The unused values in pss→idt_val is set.

DES Scavenge

When a given node is being shut down it would be preferable to be able to reuse any identity values allocated to the node that have not yet been used. Assume, for example that a given node was allocated 250 identity values, but had only used 30 of them. It would be preferable not to lose (burn) the 220 identity values that remain. To do so, the methodology of the present invention provides for information regarding the unused identifiers to be passed to the other nodes, so that any other node in the cluster will have the ability to use the free values. When DES is being scavenged at a cluster node, one has a curr_val and node_max for that node. Since the DES is getting scavenged, one knows that (node_max−curr_val) identifiers will be wasted. So the strategy adopted in the currently preferred embodiment is to take an exclusive (EX) lock and flag the entry corresponding to that node in the array as FREE (i.e., for that node from curr_val to node_max the values are FREE to be used) and not immediately redistribute the values. If one immediately tries to redistribute the values, one will have multiple chunks of identifiers at other nodes and that will unnecessarily increase the complexity during grabbing time. If one marks the entry as FREE, then there is a slight change in the identity value allocation strategy (which change is described below). As described above, if a node runs out of identifiers, the node will obtain additional identifiers from the cluster (i.e., from the range of values between cluster_current and cluster_max available at the cluster as previously described). However, another step is introduced to first find if there is a FREE chunk available in the cluster. If so, then the entries marked as FREE are reused.

Last Node DES Scavenge

The above-described scavenging approach needs to be revised in the event the node that is leaving is the last node in the cluster. In this case, all allocated, but unused identity values will be lost, unless some other steps are taken. Thus, in this case, the FREE values are written back to disk for future re-use. When the DES is scavenged at the last node in the cluster, the FREE chunks from all nodes are written to disk, in order to avoid burning all the unused identity values that were allocated for use in the cluster. The last node leaving the cluster will have the curr_val and node_max of all the nodes and also the cluster_current value. It will encode this information and write to disk, marking all of them as FREE. The on-disk representation is currently implemented as an entry in the sysattributes system table for each node in the cluster which had FREE values. Also, one stores the value of cluster_current. When the DES is reinstantiated for the first time in the cluster, it will read from the disk and initialize the array values depending on the values stored in the disk.

Methodology for Reuse of Identifiers of Leaving Node

Figure 6:
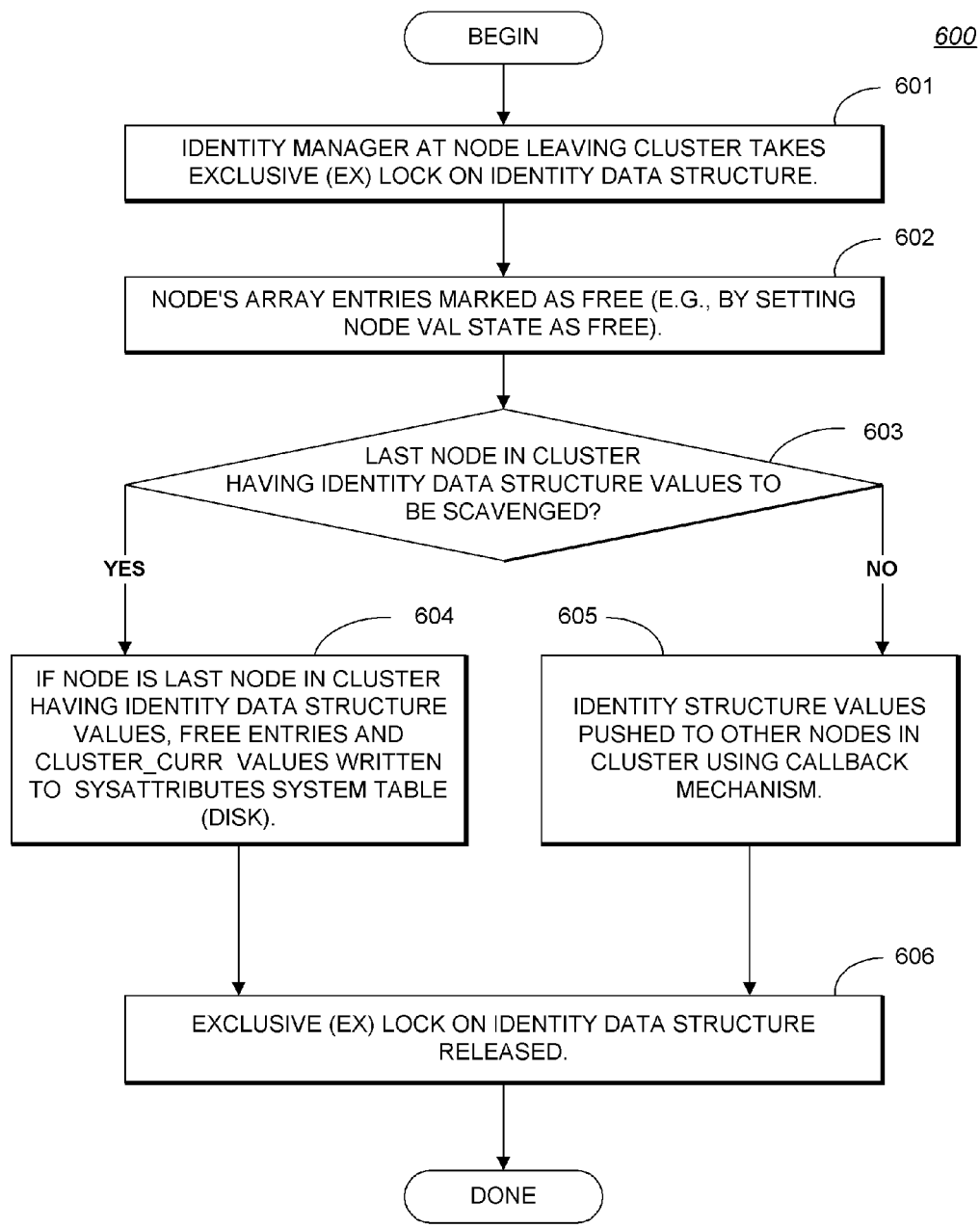
FIG. 6 is a flowchart illustrating the methodology of the present invention for scavenge of identifiers when a node leaves the cluster.

FIG. 6 is a flowchart illustrating the methodology 600 of the present invention for scavenging identifiers when a node leaves the cluster. The methodology enables reuse of identifiers cached by a node when the node leaves the cluster. When a node is leaving the cluster, the identity manager at the node takes an exclusive lock on the identity data structure at step 601. Next, the current node's array entries are marked as FREE at step 602. Currently, this is done by setting the node val state as FREE. At step 603, a check is made to determine whether the node is the last node leaving the cluster having identifiers (and identity data structure values) that need to be scavenged. If the node is the last node leaving the cluster the method proceeds to step 604. Otherwise, it proceeds to step 605. If the node is the last node in the cluster having the identity data structure values to be scavenged, the FREE entries and the cluster_current values are written to the sysattributes system table at step 604. Otherwise, if it is not the last node, the values are pushed to other nodes in the cluster using a callback mechanism at step 605. After these steps are completed, the exclusive (EX) lock on the identity data structure is released at step 606.

Identifier Allocation

For implementing reuse of identifiers marked as FREE, the previously described identity value allocation strategy is modified so that when a node needs identifiers, the identity manager at the node will first search for a FREE chunk. If there is no FREE chunk, only then will the identity manager try to allocate from the chunks between cluster_current and cluster_max as explained earlier. A node needing identity values follows the general steps described below:

1. If a node finds its own FREE chunk (i.e., the node val state in the ID array is FREE), it uses the chunk and marks the chunk NOT FREE;

2. Otherwise, it tries to get a FREE chunk. If it gets a FREE chunk, it uses that and marks it NOT FREE;

3. Otherwise, it tries to get a chunk from cached values in cluster (using the strategy explained earlier).

A side-effect of using FREE identity values of other nodes is that, the identity values in a particular node can go backward.

Node Joining/Leaving

If a node joins the cluster, there is no issue until it needs to perform an insert into the table. During the first insert, the identity manager at the node has to grab an exclusive (EX) lock to initialize its identifier (ID) block. Then, it can get the exclusive (EX) lock and get its ID block allocated. When a node leaves the cluster, the case is similar to DES scavenging as described above. Any update to the identity data structure is done under exclusive (EX) lock (thereby eliminating issues).

Cluster Shutdown

Cluster shutdown should be handled very gracefully. It is the same as DES scavenge at all nodes and one should not lose any identity values. The situation is handled in the same manner as DES scavenge (as described above) at all nodes with FREE entries getting written out to the sysattributes system table (i.e. to disk), one row per node having FREE entries.

Cluster Crash

In case of a cluster crash, since identity_gap block of identifiers are taken from sysobjects row in every node until one runs out of values, it is possible to lose a maximum (2*identity_gap−equal_share_value) number of identity values. When the cluster reboots, it starts allocating identity values from the last burned value in the sysobjects row.

Failover Handling and Recovery

Failover handling is handled in the following manner. If a node crashed and it was holding the exclusive (EX) lock at the time of crash, then the lock may be marked as INDOUBT. (If it was not holding exclusive (EX) lock, it is not marked as INDOUBT.) If lock is not INDOUBT, then one need not do anything; whatever identity values were assigned to that node will be lost.

If the lock is INDOUBT, then values of cluster_current and cluster_max may not be correct and the node doing failover will have to make the values consistent. If the DES was instantiated at any other node, then one may use the values from that other node. Remember that after every update of the identity data structure, the updated values are pushed to the other nodes. This mechanism ensures that one always has the last consistent values of the identity data structure (and one can always use those values). When the DES gets reinstantiated at some other node later, the identity values will be granted based on whatever value is in the sysobjects row. The system loses (cluster_max−cluster_current) number of values.

A lock can also be INDOUBT if DES Scavenge was underway when the node crashed. In this case, one checks if the DES is available at some other node. If the crashed node's entry is FREE, it means other node got the updated value from the node before it crashed and one can reuse the values. If the entry is not FREE, it is discarded. If the DES is not available at other node, there is no information, thus necessitating that the entry be discarded for the failed node. As the approach of the present invention involves replication, in which current values are pushed to other nodes, the last consistent values of the identity structure on all the nodes should always be available. Thus, the previous values can be used in a failover situation. This is a significant improvement from prior art approaches which rely on a centralized mechanism. With the present invention, when one node fails, the other nodes already have the necessary information and can gracefully handle the failover. In prior art centralized systems which rely on a "master" node, all the necessary information must be transferred from the master node to its successor. If the master node crashes, there is also a greater potential for loss and more extensive recovery steps are generally required. Thus, the fully distributed system and methodology of the present invention provides for increased reliability.

Cluster Boot

When the cluster boots, it must glean certain context information. Here, if the cluster shut down properly, values are stored in the sysattributes system table. If this is the case, then the approach is to initialize based on those values. An issue is how does one know whether the cluster was previously shutdown (meaning it needs to read identity values entry from sysattributes) or whether it had crashed (i.e., sysattributes does not contain any FREE values). The solution is implemented as follows. Whenever an entry is read in from the sysattributes table and used to instantiate the identifier data structure, it is immediately deleted from sysattributes so that the entry is not used anymore. Thus, when a cluster boots and tries to read entries from sysattributes, it uses existing entries (if any) to instantiate the node values, cluster_current, and cluster_max.

When a cluster boots, it checks for the following (basically the situation when DES is instantiated for first time in cluster):

1. If there is no entry in sysattributes, instantiate the ID array with zeroes and start identifier allocation from sysobjects row value. Else go to step 2

Figure 7A:
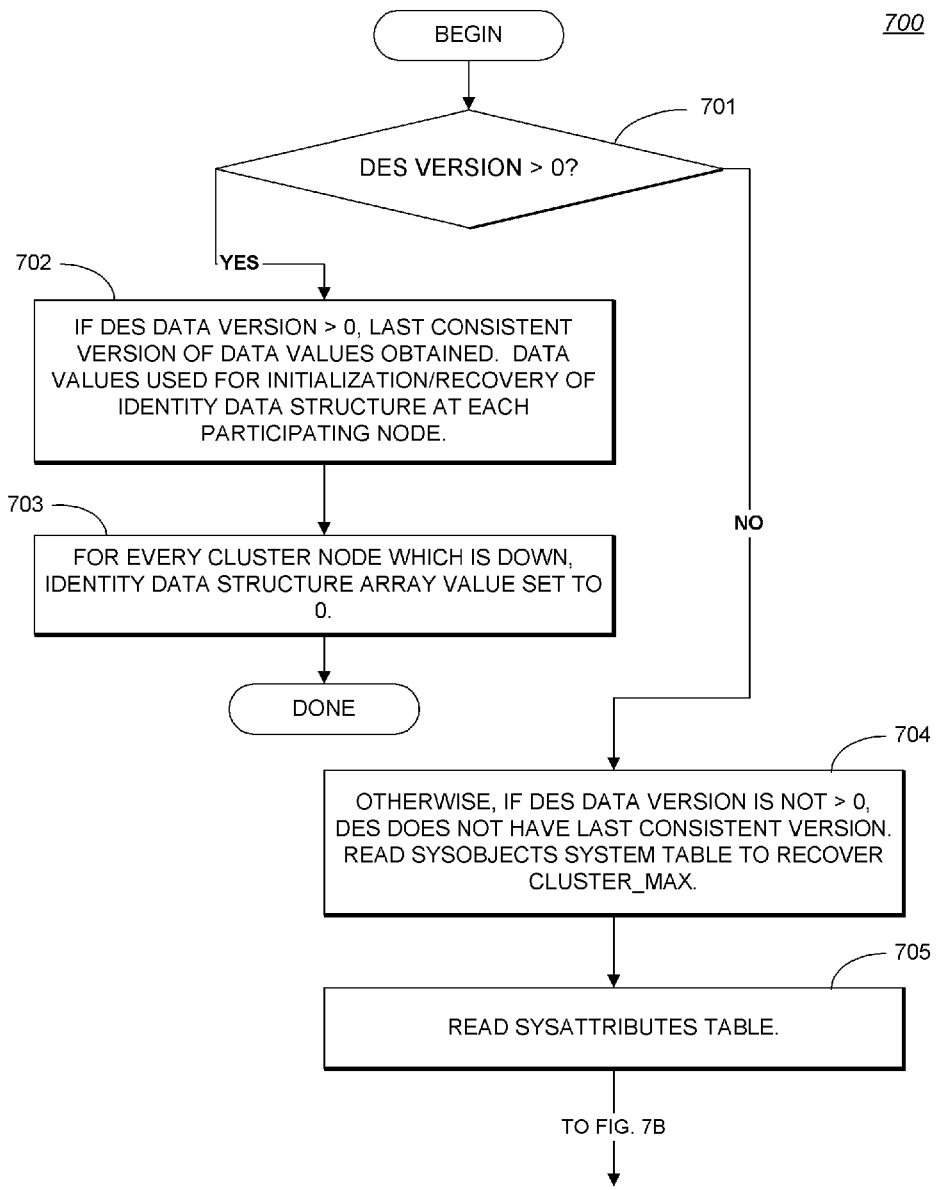
FIGS. 7A-B comprise a single flowchart illustrating the methodology of the present invention for instantiation/recovery of the identity data structure when a cluster boots.
Figure 7B:
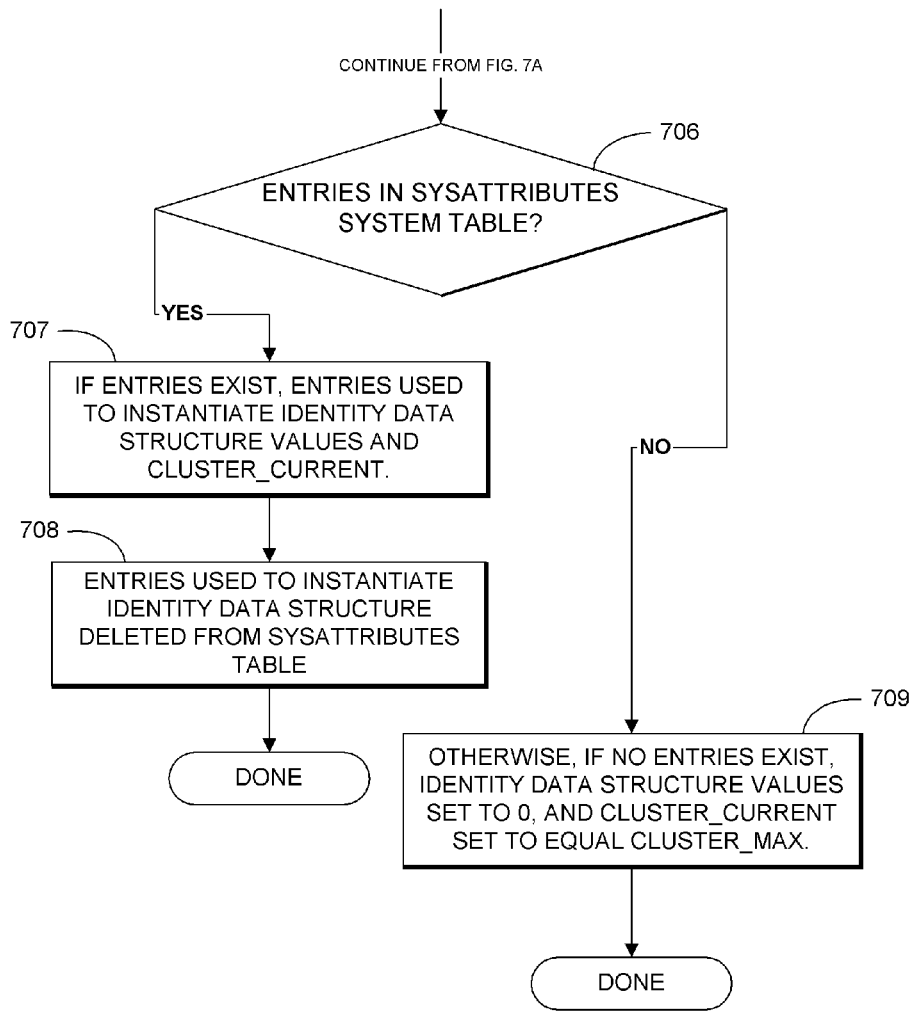

2. For every entry found in sysattributes
   a) Use it to instantiate the identity data structure and mark it as FREE for use by anyone in the cluster
   b) Delete the entry from the sysattributes table FIGS. 7A-B comprise a single flowchart illustrating the methodology 700 of the present invention for instantiation/recovery of the identity data structure when a cluster boots. At decision step 701, a check is made to determine if the DES data version is >0. If the DES data version is >0, this means that it has obtained the last consistent version of the identity data structure data values and the method proceeds to step 702. At step 702, the data values are used for initialization/recovery of the identity data structures at each participating node. The system can use the last consistent state to recover because the system always pushes updated data to each of the participating nodes after every update of the identity data structure. At step 703, for every cluster node which is down, the identity data structure array value is set to 0.

Otherwise, if the DES data version was not found to be greater than zero at step 701, the DES does not have last consistent version and the method proceeds to step 704. At step 704 the sysobjects system table is read to recover cluster_max. At step 705 the sysattributes system table is read and a check is made to determine whether entries in the sysattributes system table exist at decision step 706. If entries exist, the entries are used to instantiate the identity data structure data values and cluster_current at step 707. At step 708, the entries used to instantiate the identity data structure are deleted from the sysattributes system table. Otherwise if no entries are found to exist at step 706, the identity data structure values are set to 0, and cluster_current is set to equal cluster_max at step 709.

Special-Case: Last Set of Identity Values

The following describes how to handle the last set of identity values using this approach. Since an equal sharing approach cannot be used when one hits the last set of identity values, an alternate mechanism is employed to solve this special case (where one grabs identifiers from other nodes in the cluster). Two basic approaches may be employed:

1. Periodically check whether a node is under-utilizing its identity values.

2. Use a grabbing method to grab identity values from other nodes.

Periodic Check Strategy

In this method, a particular node is periodically checked to determine whether it is under-utilizing its identity values, and when detected (i.e., "yes"), then that node is asked to donate its identity values (i.e., mark the entry for that node as FREE). How does one decide whether a node is under-utilizing its values? Heuristics may be employed, such as evaluating whether the current value (curr_val) of a node is much less than the current cluster maximum value (cluster_max). If so, then the node is a candidate for donation. For deciding how often to check, one can employ a strategy like check for every kth number of sysobjects row accesses.

Reduced Equal Share Strategy

In this method, one reduces the value of equal_share_value to a reduced value as soon as the last chunk of values is hit. As soon as one comes to last set (when number of identity values remaining in sysobjects row is <=identity_gap), the value of equal_share_value is set to a pre-defined watermark (say last_share_value=10). After this, every node takes last_share_value number of identifiers from the cluster cache whenever it needs identifiers. In this scheme, one does not need to do any grabbing from other nodes. However, this increases the number of EX LOCKS for last set of values and the total amount of identifiers that be underutilized in the cluster, which in the worst case will be equal to (last_share_value*no._of_nodes). Whenever the last set is hit, the following logic is performed:
If last_share_value<equal_share_value, then
Equal_share_value=last_share_value.

The preferred approach is a combination of the above, employing the following strategy. When one hits the last point where there are no values left in cluster and sysobjects row, a message is sent to all the nodes asking them to freeze inserts for the time being and give back all their identity values, similar to DES Scavenging. Thus, all the nodes will mark their entry as FREE. At this point, one has multiple FREE chunks of identity values from which to allocate. This may be done using a callback mechanism. Now onwards, one may start allocating from these FREE blocks of identity values in chunks of last_share_value to each node. In the worst case, one will lose in the cluster a maximum of (last_share_value*no._of_nodes) number of values. Typically the last_share_value is set to 1 to reduce number of values to a bare minimum. So, every node will take one value at a time from the FREE chunks and as a result, the maximum loss will be upper bounded by no._of_nodes.

The following steps are followed in this approach:

1. Take exclusive (EX) lock.
2. No values for current node to mark FREE, but still put all 0's in current node entry. Set equal_share_value=last_share_value.
3. Send message to all other nodes to surrender their values, the callback function in the notified nodes will stop all local access to the identity array and set identity array state as FREE. All nodes set equal_share_value=last_share_value.
4. After step 3, all the nodes have stopped their operations and surrendered their values to be used in the cluster. Now, every node can take last_share_value number of identifiers from the FREE chunks.
5. Current node gets last_share_value number of identifiers from the FREE chunks.
6. Push the updated values to all the other nodes in the cluster.
7. Release the exclusive (EX) lock.

Performance Study

As previously discussed, the performance of any scheme can be evaluated on the basis of two parameters (i) the number of sysobjects row accesses to the disk and (ii) the number of exclusive (EX) locks that needs to be taken (ignoring for the time being the amount of exclusive (EX) locks and performance hit that will happen when one reaches the last chunk of identity values). Assuming that the total number of identity values=T, I is the identity_gap, and N is the number of nodes, one can observe that:

(i) the number of sysobjects row accesses=(T/I), since every time one takes I number of values from sysobjects row for distributing in the cluster.

(ii) the number of exclusive (EX) locks=(N)*(T/I), since for every set of identity_gap values, number of exclusive (EX) locks will be N. The number of such sets is (T/I) and so total amount of locks=N*(T/I).

It should be noted that exclusive (EX) locks are also taken during DES Scavenge operation, but these may be ignored as not quantifiable.

Detailed Internal Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Identity Data Structure

For implementation of the present invention, a new identity data structure (and related macros) is introduced in DES which is instantiated on all nodes in the cluster. The identity data structure is as follows:

```
 1: typedef struct identity_info_node {
 2:     BYTE       idt_node_curr[NUMERIC_MAXSIZE];      /* current value of node */
 3:     BYTE       idt_node_max[NUMERIC_MAXSIZE];       /* max value of node */
 4:     BYTE       idt_node_val_state;   /* state of values in the node */
 5: } IDENTITY_INFO_NODE;
 6:     IDENTITY_INFO_NODE idt_clusternodes_info[CLUSTER_IDENTITY_NODES];
 7:     BYTE      idt_cluster_curr[NUMERIC_MAXSIZE]; /** cluster current value: */
 8: /* States for idt_node_val_state */
 9: #define IDENTITY_NODE_VAL_FREE 0x01 /* FREE state means the id values were
10:     allocated to this node but they are now free
11: to be used in the cluster because a DES
12:     scavenge or a cluster shutdown happened.
13: */
14:
15: #define IDENTITY_NODE_VAL_ALLOCATED    0x02
16: /* ALLOCATED state means the id values were allocated to this node
17: ** and are being used by the node. So, they cant be used
```

```
18: ** by others in the cluster.
19: */
20: #define IDENTITY_NODE_VAL_UNALLOCATED    0x04
21: /* UNALLOCATED state means the id values have not been allocated to
this node */
22: #define IDENTITY_NODE_DES_INST    0x08
23: /*    state means node has instantiated the des */
24:
25: #define IDENTITY_NODE_DES_LASTSET        0x10
26: /*    state means last set of id values has been hit*/
```

The data structure comprises an array which includes the following three entries: the node current value (idt_node_curr), the node maximum value (idt_node_max), and the state of values of the node (idt_node_val_state). The size of the array is equal to number of nodes supported in the cluster. Also, a cluster-wide OCM lock is defined to protect this data structure. The above information is maintained at every node. Thus, every node has the information for itself and all other nodes. Although not included in the above structure, the cluster current value is also maintained. In the currently preferred embodiment, the cluster max (cluster_max) value is maintained in another data structure of the DES.

Identity Allocation Routine for Cluster Environment

In the currently preferred embodiment of the present invention, the main identity allocation routine (DES_NODE_NEWIDT_VALUES) of the identity manager on a node in the cluster is called to allocate identity values in one of the following circumstances:

1. Node value state=UNALLOCATED, which means that a block of values need to be allocated to the node.

2. Node current value=node max value, which indicates that no identity values remain available at the node and an additional block of identifiers needs to be allocated.

3. The identity grab size is set, but (node current value+ identity grab size)<node max value.

When a new block of identifiers is to be allocated to a node, the node takes a cluster wide OCM lock on the identity structure to ensure that no other node in the cluster can allocate identifiers until the current node finishes and releases the lock. This is illustrated as follows:

```
1:  /*
2:  ** Take exclusive right to update the identity structure.
3:  ** Obtain ocm lock in exclusive mode.
4:  */
5:  ocm_lock(&des->d_ocb_identity, EX_OBJ);
6:
7:  /* Hold the cluster-wide lock in this task */
8:  ocm_hold(&des->d_ocb_identity);
```

The identity data structure provides access to the latest values for the cluster current value (cluster_curr), the cluster maximum value (cluster_max) and a node array of values. Next, a check is made to determine if there are FREE identifiers available as follows:

```
1:  /*
2:  ** First check if we have FREE entries.
3:  */
4:  if ( Resource->rconfig->idt_grab_size > 1)
5:  {
6:     /* Take grab size from FREE entries */
7:  }
8:  else
9:  {
10:    /*
11:    ** First check for this node entry, then
12:    ** search other node entries.
13:    */
14:    if (des->didt.idt_clusternodes_info[nodeid].idt_node_val_state
15:         & IDENTITY_NODE_VAL_FREE)
16:    {
17:       /* FREE state should always be accompanied by UNALLOCATED state
18:    */
19:
20:    SYB_ASSERT(des->didt.idt_clusternodes_info[nodeid].idt_node_val_state
21:    &
22:         IDENTITY_NODE_VAL_UNALLOCATED);
23:    des->didt.idt_clusternodes_info[nodeid].idt_node_val_state &=
24:         ~(IDENTITY_NODE_VAL_UNALLOCATED);
25:    des->didt.idt_clusternodes_info[nodeid].idt_node_val_state &=
26:         ~(IDENTITY_NODE_VAL_FREE);
27:    des->didt.idt_clusternodes_info[nodeid].idt_node_val_state |=
28:         (IDENTITY_NODE_VAL_ALLOCATED);
29:
30:    free_node_curr.value =
31: des->didt.idt_clusternodes_info[nodeid].idt_node_curr;
32:    stat = com_exctnume_inc(&free_node_curr);
33:    if (stat == O_OVERFLOW)
34:    {
35:       ocm_unhold(&des->d_ocb_identity);
```

```
36:         ocm_unlock(&des->d_ocb_identity);
37:         return(IDT_OVERFLOW);
38:     }
39:
40:     MEMMOVE(des->didt.idt_clusternodes_info[nodeid].idt_node_curr,
41:         num_rtrn->value, NUMERIC_MAXSIZE);
42:
43:     /*
44:     ** Updating the array entries for itself and
45:     ** cluster_current.
46:     ** update other nodes about the change.
47:     */
48:     des_identity_notify(des, des->ddbid,
49:         des->dobjectc.objostat.objid,
50:         DES_IDT_PCM_PUSH, nodeid);
51:
52:     ocm_unhold(&des->d_ocb_identity);
53:     ocm_unlock(&des->d_ocb_identity);
54:     return IDT_SUCCESS;
55:
56: }
```

As previously discussed, FREE identifiers may be available as a result of another node leaving the cluster or surrendering its values. If a block of FREE identifiers is found, they are allocated to the local node as follows:

```
1:
2:  for (i = 0; i < CLUSTER_IDENTITY_NODES; i++)
3:  {
4:      /* If FREE entry is found, allocate equal_share_value ids. */
5:      if (i == nodeid) continue;
6:
7:      if (des->didt.idt_clusternodes_info[i].idt_node_val_state
8:          & IDENTITY_NODE_VAL_FREE)
9:      {
10:         /* FREE state should always be accompanied by
            UNALLOCATED
11: state */
12:
13:
14:         /* Out of all values allocate only max equal_share_value ids
15: */
16:
17:         free_node_curr.value =
18: des->didt.idt_clusternodes_info[i].idt_node_curr;
19:         free_node_max.value =
20: des->didt.idt_clusternodes_info[i].idt_node_max;
21:         /* temp_nume = (free_node_curr + equal_share_value */
22:         stat = com__exctnume_addorsub(&free_node_curr,
23: &equal_share_value,
24:                             &temp_nume,
25: 0);
26:         cmp_res = com__exctnume_cmp(&temp_nume,
            &free_node_max,
27: NUMECMP_DEFAULT);
28:
29:         MEMMOVE(des->didt.idt_clusternodes_info[i].idt_node_curr,
30:             des->didt.idt_clusternodes_info[nodeid].idt_node_curr,
31:             NUMERIC_MAXSIZE);
32:         if (cmp_res < 1)
33:         {
34:             /*
35:             ** (free_node_curr + equal_share_value) <=
                free_node_max
36:             ** nodeid_curr = free_node_curr + equal_share_value;
37:             ** free_node_curr = free_node_curr + equal_share_value;
38:             */
39:         }
40:         MEMMOVE(temp_nume.value,
41:             des->didt.idt_clusternodes_info[nodeid].idt_node_max,
42:             NUMERIC_MAXSIZE);
43:         MEMMOVE(temp_nume.value,
44:             des->didt.idt_clusternodes_info[i].idt_node_curr,
45:             NUMERIC_MAXSIZE);
46:         /*
47:         ** if (free_node_curr + equal_share_value) =
                free_node_max )
48:         ** there are no free id values left for node i anymore.
49:         */
50:         if (cmp_res == 0)
51:         {
52:             des->didt.idt_clusternodes_info[i].idt_node_val_state &=
53:
54: ~(IDENTITY_NODE_VAL_FREE);
55:
56: MEMZERO(des->didt.idt_clusternodes_info[i].idt_node_curr,
57:
58: NUMERIC_MAXSIZE);
59:
60: MEMZERO(des->didt.idt_clusternodes_info[i].idt_node_max,
61:
62: NUMERIC_MAXSIZE);
63:         }
64:     }
65:     else
66:     {
67:     }
68:         MEMMOVE(des->didt.idt_clusternodes_info[i].idt_node_max,
69:             des->didt.idt_clusternodes_info[nodeid].idt_node_max,
70:             NUMERIC_MAXSIZE);
71:         des->didt.idt_clusternodes_info[i].idt_node_val_state &=
72:             ~(IDENTITY_NODE_VAL_FREE);
73:         MEMZERO(des->didt.idt_clusternodes_info[i].idt_node_curr,
74:             NUMERIC_MAXSIZE);
75:         MEMZERO(des->didt.idt_clusternodes_info[i].idt_node_max,
76:             NUMERIC_MAXSIZE);
77:
78:     }
79:
80:     des->didt.idt_clusternodes_info[nodeid].idt_node_val_state &=
81:         ~(IDENTITY_NODE_VAL_UNALLOCATED);
82:     des->didt.idt_clusternodes_info[nodeid].idt_node_val_state |=
83:         (IDENTITY_NODE_VAL_ALLOCATED);
84:     free_node_curr.value =
85: des->didt.idt_clusternodes_info[nodeid].idt_node_curr;
86:     stat = com__exctnume_inc(&free_node_curr);
87:     if (stat == O_OVERFLOW)
88:     {
89:         ocm_unhold(&des->d_ocb_identity);
90:         ocm_unlock(&des->d_ocb_identity);
91:         return(IDT_OVERFLOW);
92:     }
93:     MEMMOVE(des->
        didt.idt_clusternodes_info[nodeid].idt_node_curr,
94:         num_rtrn->value, NUMERIC_MAXSIZE);
95: }
```

```
 96:
 97:    /*
 98:    ** Changed the array entries for local node and node i.
 99:    ** Push this change to others.
100:    */
101:    des_identity_notify(des, des->ddbid,
102:        des->dobjectc.objostat.objid,
103:        DES_IDT_PCM_PUSH, nodeid);
104:
105:    des_identity_notify(des, des->ddbid,
106:        des->dobjectc.objostat.objid,
107:        DES_IDT_PCM_PUSH, i);
108:
109:    ocm_unhold(&des->d_ocb_identity);
110:    ocm_unlock(&des->d_ocb_identity);
111:        return(IDT_SUCCESS);
112:    } /* if */
113:    } /* for */
114: } /* if then else */
```

If FREE entries are found and allocated to the local node, entries reflecting this allocation are made in the identity data structure, and the updates are pushed to the other nodes as shown above commencing at line 101. When this is complete, the lock on the identity structure is released.

In other cases, however, there may be no FREE entries available. If no FREE entries are found, then a block of identifiers is allocated from the cluster level (if available at the cluster level). At this point a check is made to determine if there are identifiers available at the cluster level that can be allocated to the node as follows:

```
 1:    /*
 2:    ** Come here when there are no FREE entries in the cluster,
 3:    ** and hence, need to allocate from cluster_current to cluster_max.
 4:    */
 5:
 6:        cluster_curr.value = des->didt.idt_cluster_curr;
 7:
 8:    /* cluster_max is the objidentburnmax value */
 9:    cluster_max.value = des->dobjectc.objidentburnmax;
10:
11:    /* compare the cluster_max and cluster_curr values */
12:    cmp_res = com___exctnume_cmp(&cluster_curr, &cluster_max,
13: NUMECMP_DEFAULT);
14:
15:    /*
16:    ** First check if cluster_curr > cluster_max
17:    ** Raise an error
18:    */
19:
20:    if (cmp_res == 1)
21:    {
22:
23:    }
24:    else
25:    if (cmp_res == -1)
26:    {
27:        /*
28:        ** cluster_curr < cluster_max, so check if we can
29:        ** grant this request
30:        */
31:
32:        if ( Resource->rconfig->idt_grab_size > 1)
33:        {
34:            /*
35:            ** identity_grab_size parameter is set
36:            /*
37:
38:            /*
39:            ** check if (cluster_curr + grab_size <= cluster_max)
40:            */
41:
42:            /* taking out the identity_grab_size_value */
43:            idt_get_grab_size(&equal_share_value, &des->didt);
44:
45:            /* adding cluster_curr and identity_grab_size =
                  temp_nume */
46:            stat = com___exctnume_addorsub(&cluster_curr,
                  &equal_share_value,
47:                &temp_nume,
48: 0);
49:
50:
51:            cmp_res =
                com___exctnume_cmp( &cluster_max, &temp_nume,
52: NUMECMP_DEFAULT);
53:            if (cmp_res > -1)
54:            {
55:            /*
56:            ** (cluster_curr + grab_size)<= cluster_max
57:            ** Following steps will be done
58:            ** 1. pss->pidtvalinfo.idtstart = cluster_current + 1;
59:            ** 2. cluster_current = cluster_current + grab_size;
60:            ** set other fields in pss->pidtvalinfo
61:            */
62:
63:        /*
64:        ** Nothing to be done here. Setting of the values
65:        ** done outside the loops.
66:        */
67:    }
```

As previously discussed, if the cluster current value (cluster_curr) plus the grab size is less than cluster_max, then identifiers are available at the cluster level for allocation to the local node. If this is the case, identity values are allocated to the node and entries in the identity data structure are updated. (Note that these steps are done outside of the above routine). However, if there are no identifiers available at the cluster level (e.g., if (cluster_curr+grab_size)>cluster_max), additional identity values need to be obtained from disk. In this case, an allocation is obtained from disk for use in the cluster and a block of identifiers are allocated to the node. Cluster_curr, cluster_max and other entries in the identity data structure are also updated to reflect the allocation. As previously discussed, special handling is also provided when the last set of identity values is hit. Once the updates to the identity structure have been made, the updated values are sent to the other nodes so that all nodes are in sync. When these steps have been completed, the cluster wide OCM lock on the identity data structure is released.

Detection of Last Node DES Scavenge/Release

As previously mentioned, when a DES Scavenge is performed at a particular node, a check is performed to see if the node is the last node in the cluster that has the DES instantiated. If that is the case (i.e., true), the last node needs to write out the FREE values and value of cluster_current to sysattributes system table. An efficient manner of determining this is required. (Sending a message to all nodes asking whether they have the DES instantiated is inefficient and is not adopted.)

A new state in the ID values state is introduced: IDENTITY_NODE_DES_INST. If this bit (state) is set for any particular node entry in the array, then the particular node has instantiated the DES. Since the updated changes are pushed at all times, every node is guaranteed to have the correct information about every other node whether the DES has been instantiated at the other nodes or not. When the DES is instantiated at any node, the bit is set and the update is pushed to all other nodes.

The following steps are executed at DES Scavenge time
a) Take cluster wide OCM EX lock.
b) Reset current node IDENTITY_NODE_DES_INST bit. Need to let others know that des has been scavenged on this node.
c) For all nodes in the cluster other than current node, check if IDENTITY_NODE_DES_INST bit is set for any node. If the bit is set, there is one more node which has DES instantiated so current node is not last node. So, push the updated values to other nodes. If bit is not set, it means current node is the last node. Do other processing (sysattributes writing) as previously mentioned.
e) Release lock.

Detection of Lastset Hit Case

When one runs out of identity values, the id values that have been allocated in the cluster need to be redistributed. An efficient way to determine whether to do lastset allocation or regular allocation is required. Checking for cluster_current and cluster_max every time will not enable this determination. In order to do, therefore, a special bit is introduced: IDENTITY_NODE_DES_LASTSET. This bit is set to indicate that the last set has been hit and one needs to allocate id values differently.

When DES is instantiated at every node, the system resets this bit. When the lastset is hit, the first node that detects that set its bit and send a message to all other nodes to surrender their values (as explained earlier). As part of the callback function handling, the notified nodes (as part of the id values surrender process) set the corresponding bit in their array value. Thus, at every node, without checking for cluster_current and cluster_max the system is able to efficiently determine whether it has hit the lastset of values (and thus do special handling for that case).

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a distributed system having a plurality of nodes, a method for allocating identifiers for use at nodes of the distributed system, the method comprising:
    allocating a pool of identifiers for use in the system;
    maintaining a list of free identifiers in the pool at all participating nodes in the system;
    obtaining at a first node permission to update the list of free identifiers;
    upon receiving permission to update the list, the first node allocating for itself a set of identifiers from the list of free identifiers;
    updating the list of free identifiers to reflect allocation of the set of identifiers for the first node;
    sending the updated list of free identifiers from the first node to other participating nodes;
    upon receiving the updated list of free identifiers at each other participating node, updating each other participating node's respective copy of the list of free identifiers; and
    relinquishing the first node's permission to update the list of free identifiers.

2. The method of claim 1, wherein said distributed system comprises a distributed database system including a plurality of database server nodes sharing access to a database.

3. The method of claim 2, wherein said identifiers comprise row identifiers for uniquely identifying a particular row of a table of the database.

4. The method of claim 1, wherein said maintaining step includes maintaining the list of free identifiers in memory at each of said participating nodes.

5. The method of claim 1, wherein said obtaining step includes obtaining an exclusive lock on said list of free identifiers at each of said participating nodes.

6. The method of claim 5, wherein said relinquishing step includes releasing said exclusive lock.

7. The method of claim 1, further comprising:
    upon the first node leaving the distributed system, sending a list of unused identifiers allocated to the first node to other participating nodes, so as to enable other participating nodes to use said unused identifiers.

8. The method of claim 7, further comprising:
    allocating a set of identifiers from said list of unused identifiers to a given participating node when additional identifiers are needed at the given node.

9. The method of claim 1, further comprising:
    upon the first node leaving the distributed system, determining if other nodes continue to participate in the distributed system;
    if other nodes continue to participate in the distributed system, sending a list of unused identifiers allocated to the first node to other participating nodes, so as to enable other participating nodes to use said unused identifiers; and
    otherwise, writing the list of unused identifiers to disk, so as to enable future use of such unused identifiers.

10. The method of claim 1, wherein said step of allocating a pool of identifiers includes allocating a block of identifiers from disk and recording information on disk about allocation of the block of identifiers.

11. The method of claim 10, wherein said step of the first node allocating for itself a set of identifiers includes allocating a set of identifiers from the pool without writing information about the allocation to disk.

12. The method of claim 1, further comprising:
    allocating one or more identifiers to a task running at the first node from the set of identifiers allocated to the first node when the task needs identifiers.

13. The method of claim 12, wherein said step allocating one or more identifiers to the task includes maintaining information about identifiers allocated to the task at the first node, without updating other participating nodes about identifiers allocated to the task.

14. The method of claim 13, further comprising:
    upon migration of the task from the first node to a second node of the distributed system, sending information about identifiers allocated to the task to the second node, so that the task may use such identifiers after migration to the second node.

15. A computer-readable medium having processor-executable instructions for performing the method of claim 1.

16. A system for allocating identifiers for use at a plurality of database server nodes sharing access to a database, the system comprising:
    a database;
    a plurality of database server nodes connected to each other via a network and sharing access to the database;
    an identity data structure at each database server node for maintaining information about identifiers allocated for use among the plurality of database server nodes;
    a distributed lock for regulating access to the identity data structure at the plurality of server nodes; and an identity manager, responsive to a request for identifiers at a given node, for acquiring the distributed lock on the identity data structure, allocating a set of identifiers to the given node upon acquiring the distributed lock, updating the identity data structure at said plurality of database server nodes to reflect allocation of the set of identifiers for the given node, and relinquishing the distributed lock after completion of updates to the identity data structure at all database server nodes.

17. The system of claim 16, wherein said plurality of database server nodes comprise a cluster of database server nodes sharing access to a database persistently stored on disk storage.

18. The system of claim 17, wherein the identity manager, in response to a particular database server node leaving the cluster, updates the identity data structure at each database server node with a list of unused identifiers allocated to the particular database server node, so as to allow use of such unused identifiers.

19. The system of claim 18, further comprising:
allocating a set of identifiers from said list of unused identifiers to the given node in response to the request for identifiers at the given node.

20. The system of claim 17, wherein the identity manager, in response to a particular database server node leaving the cluster, writes a list of unused identifiers allocated to the particular node to disk if no other nodes remain in the cluster.

21. The system of claim 16, wherein said identifiers comprise unique identifiers for identifying particular rows of a table of the database.

22. The system of claim 16, wherein the identity data structure maintains the information about identifiers in memory at each of said plurality of database server nodes.

23. The system of claim 16, wherein the distributed lock comprises an exclusive lock which, when invoked by the identity manager at a given database server node, blocks access to the identity data structure by other database server nodes.

24. The system of claim 16, wherein the identity manager tracks quantities of identifiers allocated for use among the plurality of database server nodes and obtains an additional pool of identifiers from the database when necessary.

25. The system of claim 24, wherein said identity manager at a given node allocates a set of identifiers from a pool previously obtained from the database for use at the given node in response to the request from the given node.

26. The system of claim 25, wherein said step of allocating for the given node a set of identifiers includes allocating a set of identifiers from the pool without writing information about the allocation to disk.

27. The system of claim 24, wherein the identity manager divides the pool of identifiers obtained from the database into smaller blocks for allocation of said smaller blocks amongst the plurality of database server nodes.

28. The system of claim 27, wherein said smaller blocks are allocated to a given database server node in response to demand for identifiers at the given database server node.

29. The system of claim 27, wherein size of said smaller block is determined based on number of database server nodes sharing access to the database.

30. The system of claim 16, wherein the identity manager allocates one or more identifiers to a particular task running at the given node from a set of identifiers previously allocated to the given node when the particular task needs identifiers.

31. The system of claim 30, wherein said identity manager maintains information about identifiers allocated to the task at the given node, without updating other participating nodes about identifiers allocated to the task.

32. The system of claim 31, wherein said identity manager sends information about identifiers allocated to the task at the given node to a second node upon the task migrating to the second node, so that the task may use the allocated identifiers after migration to the second node.

33. In a distributed database system having a plurality of nodes sharing access to a database, a method for allocating identifiers for use at nodes of the distributed system, the method comprising:

allocating a pool of identifiers from the database for use among the plurality of nodes of the distributed database system;

maintaining information about the pool of identifiers at each of the nodes in an identity data structure;

in response to a request for identifiers at a given node, providing identifiers from a set of identifiers previously allocated for use at the given node while identifiers remain in the set allocated for the given node;

when no identifiers remain in the set, obtaining additional identifiers for use at the given node by performing substeps of:

acquiring a lock on the identity data structure at each of the nodes;

at the given node, allocating identifiers available in the pool for use at the given node;

updating the identity data structure to reflect allocation of the identifiers for the given node; and upon updating the identity data structure at all nodes, relinquishing the lock.

34. The method of claim 33, wherein said identifiers comprise row identifiers for uniquely identifying a particular row of a table of the database.

35. The method of claim 33, wherein said maintaining step includes protecting the identity data structure with a distributed lock.

36. The method of claim 33, wherein said maintaining step includes maintaining the information about the pool in memory at each of the nodes.

37. The method of claim 33, further comprising:
upon a first node leaving the distributed database system, sending a list of unused identifiers allocated to the first node to at least one other node, so as to enable use of said unused identifiers at said at least one other node.

38. The method of claim 33, further comprising:
upon a first node leaving the distributed database system, determining if at least one other node continues to participate in the distributed database system;

if at least one other node continues to participate, sending a list of unused identifiers allocated to the first node to said at least one other nodes; and otherwise, writing the list of unused identifiers to disk.

39. The method of claim 33, wherein said step of allocating a pool of identifiers includes allocating a block of identifiers from disk and recording information on disk about allocation of the block of identifiers.

40. The method of claim 33, wherein said substep of allocating identifiers available in the pool includes allocating such identifiers without writing information about the allocation to disk.

41. The method of claim 33, further comprising:
allocating one or more identifiers to a task running at the given node from identifiers allocated to the given node when the task needs identifiers.

42. The method of claim 41, wherein said step of allocating one or more identifiers to a task includes allocating such identifiers without writing information about the allocation to disk.

43. The method of claim 41, wherein said step of allocating one or more identifiers to a task includes maintaining information about identifiers allocated to the task at the given node, without updating other nodes of the distributed database system about identifiers allocated to the task.

44. The method of claim 41, further comprising:
upon migration of the task from the given node to a different node of the distributed system, sending information about identifiers allocated to the task to the different node, so that the task may use such identifiers after migration.

45. The method of claim 41, further comprising:
when no identifiers remain in the pool, obtaining an additional allocation of identifiers from the database for use among the plurality of nodes of the distributed database system.

46. The method of claim 45, further comprising:
dividing the additional allocation of identifiers obtained from the database into a plurality of blocks for allocation amongst the plurality of nodes.

47. The method of claim 46, further comprising:
allocating one of the blocks to a given node in response to demand for identifiers at the given node.

48. The method of claim 46, wherein said dividing step includes dividing the allocation of identifiers obtained from the database based on number of nodes of the distributed database system.

49. A computer-readable medium having processor-executable instructions for performing the method of claim 33.

* * * * *